(12) United States Patent
Potkonjak

(10) Patent No.: US 8,539,296 B2
(45) Date of Patent: Sep. 17, 2013

(54) COORDINATION OF PACKET AND ACKNOWLEDGMENT RETRANSMISSIONS

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 968 days.

(21) Appl. No.: 12/463,460

(22) Filed: May 11, 2009

(65) Prior Publication Data
US 2010/0284476 A1 Nov. 11, 2010

(51) Int. Cl.
G06F 11/00 (2006.01)
H04L 1/08 (2006.01)

(52) U.S. Cl.
USPC ............................ 714/746; 714/752; 370/235

(58) Field of Classification Search
USPC .......... 714/746, 752, 774; 375/217; 370/235
See application file for complete search history.

(56) References Cited

U.S. PATENT DOCUMENTS

| | | | |
|---|---|---|---|
| 5,345,599 A | 9/1994 | Paulraj et al. | |
| 5,768,527 A * | 6/1998 | Zhu et al. ...................... | 709/231 |
| 7,050,402 B2 | 5/2006 | Schmidl et al. | |
| 7,246,303 B2 * | 7/2007 | Bansal et al. .................. | 714/800 |
| 7,328,394 B2 * | 2/2008 | Fa et al. ........................ | 714/776 |
| 7,366,101 B1 | 4/2008 | Varier et al. | |
| 7,515,945 B2 | 4/2009 | Ruuska et al. | |
| 7,743,309 B2 * | 6/2010 | Li et al. ........................ | 714/774 |
| 8,040,904 B2 * | 10/2011 | Cai et al. ....................... | 370/401 |
| 2002/0069388 A1 * | 6/2002 | Niu et al. ...................... | 714/748 |
| 2004/0205105 A1 * | 10/2004 | Larsson et al. ................ | 709/200 |
| 2005/0233710 A1 | 10/2005 | Lakkis et al. | |
| 2006/0045063 A1 | 3/2006 | Stanford et al. | |
| 2007/0150787 A1 * | 6/2007 | Kim et al. ...................... | 714/748 |
| 2008/0294959 A1 * | 11/2008 | Chindapol et al. ............ | 714/752 |
| 2010/0269005 A1 * | 10/2010 | Budampati et al. ........... | 714/746 |

FOREIGN PATENT DOCUMENTS

| | | |
|---|---|---|
| CN | 1462517 A | 12/2003 |
| CN | 101103579 A | 1/2008 |

OTHER PUBLICATIONS

G.J. Foschini and M.J. Gans, On Limits of Wireless Communications in a Fading Environment when Using Multiple Antennas, Wireless Personal Communications 6: 311-335.
Alberto Cerpa, Jennifer L. Wong, Louane Kuang, Miodrag Potkonjak and Deborah Estrin, Statistical Model of Lossy Links in Wireless Sensor Networks, p. 1-16.
Alberto Cerpa, Jennifer L. Wong, Miodrag Potkonjak and Deborah Estrin, Temporal Properties of Low Power Wireless Links: Modeling and Implications on Multi-Hop Routing, p. 1-13.

(Continued)

*Primary Examiner* — Joseph Schell
(74) *Attorney, Agent, or Firm* — Ren-Sheng International

(57) ABSTRACT

Techniques generally related to a multi-copy transmission scheme are described. A first wireless communication device may transmit $X_i$ copies of each ith packet in an N numbers of packets over a wireless communication link to a second wireless communication device. In response, the second wireless may transmit Y copies of an acknowledgement over the wireless communication link to the first wireless communication device. The first wireless communication device may retransmit the packets if it does not receive the acknowledgement within a predetermined time period. The second wireless communication device may retransmit the acknowledgment if it does not receive other packets within another predetermined time period. N, $X_i$, and Y may be optimized for one or more of throughput, latency, and energy consumption using calculations or simulations.

39 Claims, 13 Drawing Sheets

(56) References Cited

OTHER PUBLICATIONS

Hari Balakrishnan, Venkata N. Padmanabhan, Srinivasan Seshan and Randy H. Katz, A Comparison of Mechanisms for Improving TCP Performance over Wireless Links, IEEE/ACM Transactions on Networking, Dec. 1997, p. 756-769, vol. 5, No. 6.

Gerard J. Foschini, Layered Space-Time Architecture for Wireless Communication in a Fading Environment When Using Multi-Element Antennas, Bell Labs Technical Journal, Autumn 1996, p. 41-59.

I. Emre Telatar, Capacity of Multi-antenna Gaussian Channels, p. 1-28.

Gregory G. Raleigh and John M. Cioffi, Spatio-Temporal Coding for Wireless Communications, IEEE Transactions On Communications, Mar. 1998, p.357-366, vol. 46, No. 3.

Arogyaswann J. Paulraj and Constantinos B. Papadias, Space-Time processing for Wireless Communications, IEEE Signal Processing Magazine, Nov. 1997, p. 49-83.

Jack H. Winters, On the Capacity of Radio Communication Systems with Diversity in a Rayleigh Fading Environment, IEEE Journal on Selected Areas in Communications, June 1987, p. 871-878, vol. SAC-5, No. 5.

Gerard J. Foschini, Dmitry Chizhik, Michael J. Gans, Constantinos Papadias, and Reinaldo A. Valenzuela, Analysis and Performance of Some Basic Space-Time Architectures.

Alberto Cerpa et al., "Statistical Model of Lossy Links in Wireless Sensor Networks," IEEE/ACM International Conference on Information Processing n Sensor Networks, 2005, pp. 81-88.

Alberto Cerpa et al., "Temporal Properties of Low Power Wireless Links: Modeling and Implications on Multi-Hop Routing," ACM International Symposium on Mobile Ad Hoc Networking and Computing, 2005, pp. 414-425.

Christopher M. Bishop, "Pattern Recognition and Machine Learning," 2007, pp. 137-152.

Gerard J. Foschini et al., "Analysis and Performance of Some Basic Space-Time Architectures," IEEE Journal on Selected Areas in Communications, vol. 21, No. 3, pp. 303-320, Apr. 2003.

International Preliminary Report on Patentability for International Application No. PCT/US2010/034162 mailed on Nov. 15, 2011.

Notification of Transmittal of the International Search Report and the Written Opinion of the International Searching Authority, Jun. 30, 2010.

* cited by examiner

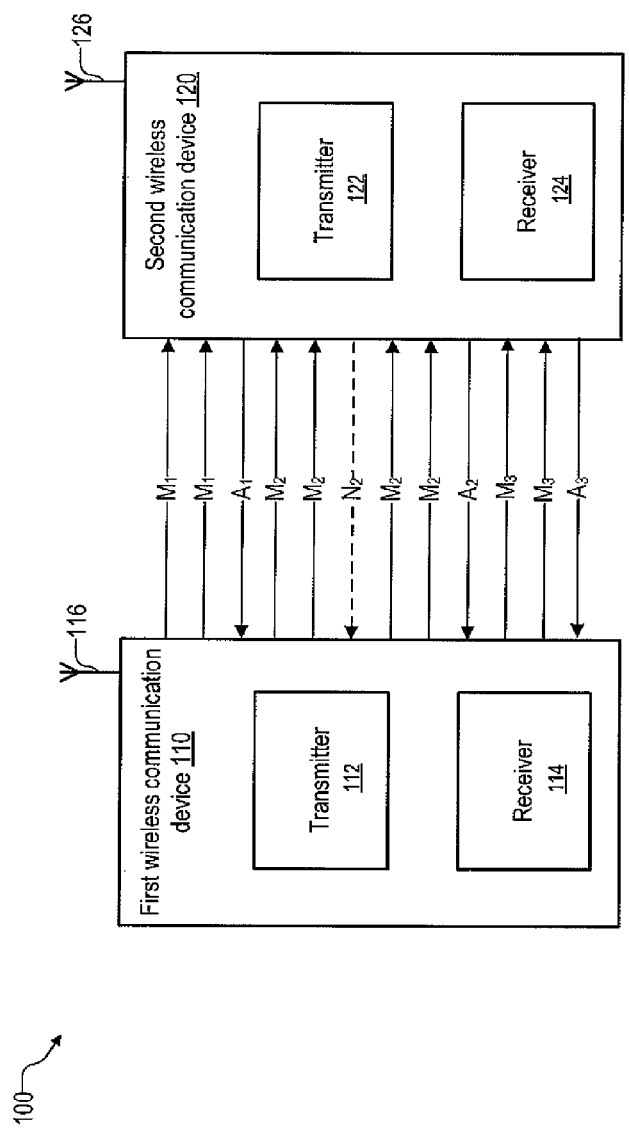

| Time Epoch | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Device 310 | $M_1$ | $M_1$ | $M_2$ | $M_2$ | $L_{1,2}^*$ | $M_3$ | $M_3$ | $M_4$ | $M_4$ | $L_4^*$ | $M_3$ | $M_3$ | $M_5$ | $M_5$ | $L_{3,5}^*$ |
| Device 320 | $L_1^*$ | $N_1$ | $L_2$ | $L_2^*$ | $A_{1,2}$ | $L_3$ | $L_3$ | $L_4^*$ | $N_4$ | $A_4$ | $L_3$ | $L_3^*$ | $L_5$ | $L_5^*$ | $A_{3,5}$ |

* Packet or acknowledgement successfully received by the listening device

| Time Epoch | 1 | 2 | 3 |
|---|---|---|---|
| Device 910 | $M_1$ | $M_1$ | $L_1$ |
| Device 920 | $L_1$* | $N_1$ | $A_1$ |
| Device 910 | $M_2$ | $M_2$ | $L_1$* |
| Device 920 | $L_2$ | $L_2$ | $A_1$ |

Link 924-1 (first two data rows), Link 924-2 (last two data rows)

* Packet or acknowledgement successfully received by the listening device

FIG. 10

| Time Epoch | 1 | 2 | 3 | 4 | 5 |
|---|---|---|---|---|---|
| Device 910 | $M_1$ | $M_1$ | $M_3$ | $M_3$ | $L_{1,3,4}$ |
| Device 920 | $L_1$* | $N_1$ | $L_3$ | $L_3$* | $A_{1,3,4}$ |
| Device 910 | $M_2$ | $M_2$ | $M_4$ | $M_4$ | $L_{1,3,4}$* |
| Device 920 | $L_2$ | $L_2$ | $L_4$* | $N_4$ | $A_{1,3,4}$ |

Link 924-1 (first two data rows), Link 924-2 (last two data rows)

* Packet or acknowledgement successfully received by the listening device

FIG. 11

COORDINATION OF PACKET AND ACKNOWLEDGMENT RETRANSMISSIONS

BACKGROUND

Unless otherwise indicated herein, the approaches described in this section are not prior art to the claims in this application and are not admitted to be prior art by inclusion in this section.

Transmission of packets between wireless communication devices is well known. However, wireless communication links for low power wireless communication devices are intrinsically lossy. For reliable communication, an acknowledgement-retransmission scheme may be employed. In the conventional acknowledgement-retransmission scheme, one node (node A) first transmits a packet to another node (node B). If node B successfully receives the packet, node B will transmit an acknowledgement back to node A. If node A does not receive an acknowledgement from node B within a certain time period or time epoch, node A will retransmit the packet to node B. Each communication session in the conventional acknowledgment-retransmission scheme requires two time epochs, one for transmitting/receiving the packet and another for transmitting/receiving the acknowledgement.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 1 illustrates an example of a multi-copy transmission scheme with one-to-one correspondence between packet and acknowledgment in a wireless communication system in accordance with one or more embodiments of the present disclosure.

FIG. 2 illustrates a table of example actions undertaken by the wireless communication devices in FIG. I in each time epoch in accordance with one or more embodiments of the present disclosure.

FIG. 10 illustrates a table of example actions undertaken by wireless communication devices in FIG. 9 over wireless communication links between the devices where a cross-link acknowledgement acknowledges one packet per link in some embodiments of the present disclosure.

FIG. 11 illustrates a table of example actions undertaken by wireless communication devices in FIG. 9 over wireless communication links between the devices where a cross-link batched acknowledgement acknowledges multiple packets per link in some embodiments of the present disclosure.

DETAILED DESCRIPTION

Figure 3:
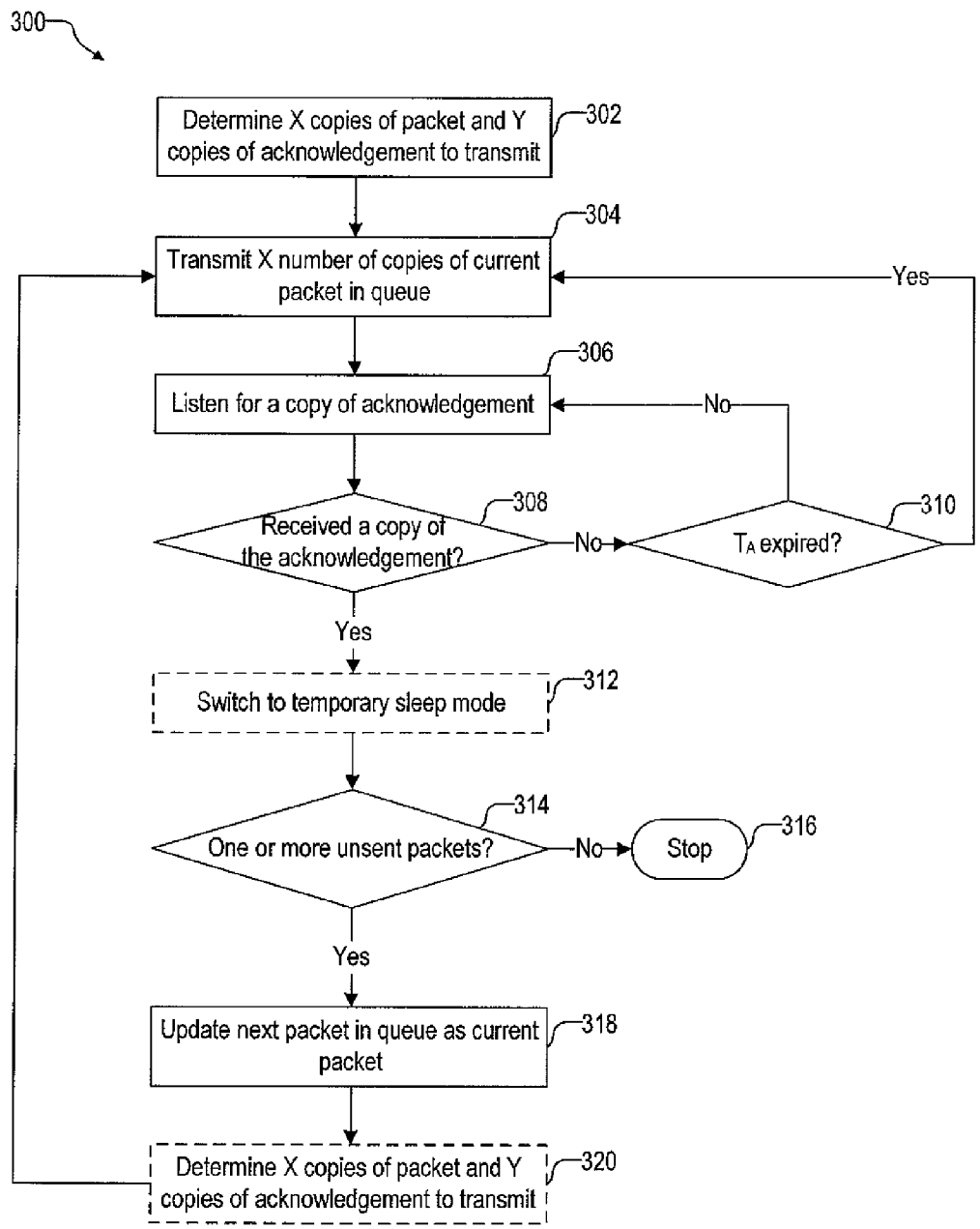
FIG. 3 is a flowchart of an example method executed by a first wireless communication device for transmitting packets to a second wireless communication device using the multi-copy transmission scheme of FIGS. 1 and 2 in accordance with one or more embodiments of the present disclosure.

In the following detailed description, reference is made to the accompanying drawings, which form a part hereof. In the drawings, similar symbols may identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs and systems related to transmitting packets in wireless devices Embodiments of the present disclosure generally relate to a multi-copy transmission scheme where multiple copies of the packet and multiple copies of the acknowledgement may be transmitted in each communication session. In some embodiments of the present disclosure, a first wireless communication device may first transmits $X_i$ number of copies of each ith packet (out of N packets) to a second wireless communication device, where one or more of $X_i$ and N may be two or more. If the second wireless communication device successfully receives a copy of the packet, the second wireless communication device may transmit Y number of copies of an acknowledgement back to the first wireless communication device, where Y may be at least one. If the first wireless communication device does not receive an acknowledgement from the second wireless communication device within a predetermined time period, the first wireless communication device may retransmit $X_i$ copies of each ith packet (out of N packets) to the second wireless communication device. Each communication session in the multi-copy transmission scheme may require $X_i+Y$ time epochs.

The presently described multi-copy transmission scheme may be arranged to minimize or reduce energy consumption. Wireless communication devices may consume varying amounts of energy during different modes of operation. Some wireless communication devices may operate in four modes, namely: transmitting, receiving, listening, and sleeping. Wireless communication devices may consume the least amount of energy when they are in sleep mode. To conserve energy, a first wireless communication device arranged in accordance with the presently described multi-copy transmission scheme may switch to a temporary sleep mode after receiving a copy of an acknowledgement from a second wireless communication device. After entering into the sleep mode for a predetermined period of time, the first wireless communication device may be configured to switch back to an active mode so the first wireless device may transmit one or more copies of a packet to the second wireless communication device. Similarly, the second wireless communication device arranged in accordance with the presently described multi-copy transmission scheme may switch to a temporary sleep mode after receiving a copy of a packet from the first wireless communication device. After entering into the sleep mode for a predetermined period of time, the second wireless communication device may be configured to switch back to an active mode so the second wireless device may receive a copy of another packet from the first wireless communication device.

The presently described multi-copy transmission scheme may be optimized based on a wireless communication device's available power supply. Different wireless communication devices may have varying amounts of available power. For example, a mobile cellular telephone operating on a battery has a limited power supply (often described in terms of milliamp-hours (mA-hr)), whereas a base station in principal may have an unlimited power supply. In the presently described scheme, calculation and power intensive process of optimizing $X_i$ copies of each ith packet (out of N packets) and Y copies of each acknowledgement may be off-loaded to from a mobile wireless communication device operating on battery based power supplied to stationary wireless communication deices with unlimited power supplies.

The presently described multi-copy transmission scheme may be arranged for a first wireless communication device to sequentially transmit a batch of packets, and a second wireless communication device to transmit a batched acknowledgment for the packets. Some acknowledgements tend to have headers that are larger than the payload (e.g., a header of 20-40 bytes compared to a payload of 1 bit to acknowledge a packet was received or not). The use of batched acknowledgements may reduce the overall number of acknowledgements used in communication between the devices without significantly increasing the size of each acknowledgement.

The presently described multi-copy transmission scheme may be employed in MIMO (Multiple Input Multiple Output) wireless communication systems. To increase bandwidth, a first wireless communication device with MIMO radios (transmitters and receivers) may transmit packets over two or more wireless communication links at approximately he same time to a second wireless communication device with MIMO radios. The second wireless communication device may transmit a cross-link acknowledgement over the two or more wireless communication links at approximately the same time to the first wireless communication device to ensure that the first wireless communication device correctly receives one or more copies of the cross-link acknowledgement. The cross-link acknowledgement may indicate which of the simultaneously transmitted packets have been received. The first or the second wireless communication device may select to use two or more of the available wireless communication links.

The presently described multi-copy transmission scheme may be optimized for throughput, latency, and energy consumption at one or both devices. The multi-copy transmission scheme may be transparent to many of the existing MAC (Medium Access Control) protocols because it may be implemented at higher levels of the abstraction.

FIG. 1 illustrates an example of a multi-copy transmission scheme 100 with one-to-one correspondence between packet and acknowledgment (i.e., N=1) in a wireless communication system in accordance with at least some embodiments of the present disclosure. Scheme 100 includes a first wireless communication device 110 with a transmitter 112, a receiver 114, and an antenna 116. Scheme 100 also includes a second wireless communication device 120 with a transmitter 122, a receiver 124, and an antenna 126. A packet may include data load and header.

In operation, two copies of a packet and one copy of an acknowledgement may be transmitted in each communication session. For example, packets may be transmitted from the transmitter 112 of the first wireless communication device 110 to the receiver 124 of the second wireless communication device 120. The transmitter 112 and the receiver 114 of the first wireless communication device 110 are configured to transmit or receive signals, respectively, with antenna 116. Likewise, the transmitter 122 and the receiver 124 of the second wireless communication device 120 are configured to transmit or receive signals, respectively, with the antenna 126.

The arrows illustrated between the first wireless communication device 110 and the second wireless communication device 120 may represent signals being transmitted in successive communication sessions. Solid-line arrows may denote a successful signal transmission. Dash-line arrows may denote an unsuccessful transmission. "M" arrows may indicate packets transmitted in the direction of the arrow. "A" arrows may indicate acknowledgments transmitted in the direction of the arrow. "N" arrows may indicate nothing was transmitted. The subscript numeral after each "M" may indicate the packet number in the series of packets. The subscript numeral after each "A" or "N" may indicate either an acknowledgment or a lack of an acknowledgement to the corresponding numbered packet.

FIG. 2 illustrates a table of example actions undertaken by wireless communication devices 110 and 112 in FIG. 1 in each time epoch. Each illustrated communication session may take three time epochs (i.e., two packet transmissions plus one acknowledgement transmission). Four different example communication sessions are illustrated in FIGS. 1 and 2. The first example communication session is illustrated as packets $M_1$ with acknowledgement $A_1$. The second example communication session is illustrated as packets $M_2$ with no acknowledgement $N_2$. The third example communication session is illustrated as packets $M_2$ with acknowledgement $A_2$. The fourth example communication session is illustrated as packets $M_3$ with acknowledgement $A_3$. Example time epochs 1-12 are also illustrated as will be described further below.

In some instances, the wireless communication link from one wireless communication device to another (e.g., from the first wireless communication device 110 to the second wireless communication device 120) may be lossy and the packets may have a probability of successful transmission of 20%, while the wireless communication link in the opposite direction (e.g., from the second wireless communication device 120 to the first wireless communication device 110) may be perfect so that the acknowledgements have a probability of successful transmission of 100%. "L" indicates the device was listening for a transmission. An asterisk ("*") after an "L" denotes a successful transmission of packet or acknowledgement (i.e., the packet or acknowledgment was successfully received by the listening device).

In example time epochs 1 and 2, the first wireless communication device 110 transmits two copies of packet $M_1$ to the second wireless communication device 120. The second wireless communication device 120 receives the first copy of packet $M_1$ in example time epoch 1. In response, the second wireless communication device 120 enters into a temporary sleep mode in example time epoch 2 to save power as it does not need to listen for the second copy of packet $M_1$, since the first packet was successful received. In example time epoch 3, the second wireless communication device 120 transmits an acknowledgement $A_1$, which is received by the first wireless communication device 110.

In example time epochs 4 and 5, the first wireless communication device 110 transmits two copies of packet $M_2$ to the second wireless communication device 120. However, the second wireless communication device 120 does not receive either copy of the packet. As a result, the second wireless communication device 120 transmits nothing in example time epoch 6.

In example time epochs 7 and 8, the first wireless communication device 110 retransmits two more copies of packet $M_2$ to the second wireless communication device 120. The second wireless communication device 120 receives the first copy of packet $M_2$ in example time epoch 7. In response, the second wireless communication device 120 enters into a temporary sleep mode in example time epoch 8 to save power as it does not need to listen for the second copy of packet $M_2$. In example time epoch 9, the second wireless communication device 120 transmits an acknowledgement $A_2$, which is received by the first wireless communication device 110.

In example time epochs 10 and 11, the first wireless communication device 110 transmits two copies of packet $M_3$ to the second wireless communication device 120. The second wireless communication device 120 receives the second copy of packet $M_3$ in example time epoch 11. In example time epoch 12, the second wireless communication device 120 transmits an acknowledgement $A_3$, which is received by the first wireless communication device 110.

The described multi-copy transmission scheme may provide a higher throughput than conventional acknowledgement-retransmission schemes. Throughput is inversely related to amount of time required to transmit a packet. The average number of time epochs that may be required to transmit a packet may be equal to $T \times (1-P^m)^{-1}$, where T may be equal to the number of time epochs per communication session, P may be equal to the probability that a transmission would not be successful, and m may be the number of copies of the packet transmitted per communication session. For a conventional acknowledgement-retransmission with P=0.8, T=2, and m=1, the average number of time epochs that may be required to transmit a packet is approximately 10 time epochs. Using the described multi-copy transmission scheme of the present disclosure as shown in FIGS. 1 and 2, where P=0.9, T=3 and m=2, the average number of time epochs that may be required to transmit a packet may be lowered to 8.33 time epochs. If in each communication session, the first wireless communication device 110 repeatedly sends a particular packet 3 times, the average number of time epochs required to transmit a packet may be reduced to 8.20 time epochs. The described time improvements may be significantly higher when: (a) each link has lower quality, (b) autocorrelation for successful transmissions is higher (as it may be the case in actual lossy wireless links), (c) sequential transmissions of a predetermined number of packets and batched acknowledgments are employed (as described later), and (d) simultaneous transmission of a cross-link acknowledgments over two or more wireless communication links in a MIMO wireless communication system is employed (as described later).

FIG. 3 is a flowchart of an example method 300 executed by the first wireless communication device 110 for transmitting packets to the second wireless communication 120 device using the multi-copy transmission scheme of FIGS. 1 and 2 in accordance with one or more embodiments of the present disclosure. Method 300 includes one or more operations, functions, or actions illustrated by blocks 302-320. The first wireless communication device 110 may be a base station, a mobile wireless device, or some other wireless communication device.

Method 300 may begin at block 302, where the first wireless communication device 110 may be arranged to determine $X_i$ (hereafter simply "X" since N=1), the number of copies of the packet to transmit to the second wireless communication device 120, and Y, the number of copies of the acknowledgement to be transmitted by the second wireless communication device 120. Depending on the specific embodiment, the first wireless communication device 110 may be configured to determine X and Y using intensive calculations on trace data, Monte Carlo-based simulations on trace data, or by making calculations on-line (i.e., in real time) with current trace data. The first wireless communication device 110 may be configured to optimize X and Y for one or more of: a) throughput, b) latency, and c) energy consumption at one or both of the devices. The first wireless communication device 110 may be adapted to set the desired throughput, latency, and energy based on the content of the data being transmitted to the second wireless communication device 120. For example, real time playback of videos requires large throughput and low latency whereas the synchronization or the storage of files may be satisfied with lower throughput and higher latency, which then can result in lower energy consumption. The first wireless communication device 110 may be arranged to send X and Y to the second wireless communication device 120 during a handshake for setting up the communication between the two devices. Alternatively, the second wireless communication device 120 may be arranged to determine X and Y and transmit the determined values to the first wireless communication 310 device during the handshake. Block 302 may be followed by block 304.

At block 304, the first wireless communication device 110 may be arranged to transmit X copies of the current packet in a queue to the second wireless communication device 120. The first wireless communication device 110 may be configured to mark each copy of the transmitted packets with a packet identifier that indicates the copy number (e.g., copy #1 out of X, copy #x out of X, etc.) so that the second wireless communication device 120 can discern which of the copies it has received. The first wireless communication device 110 may also be arranged to start a timer to track the time since transmitting the copies of the current packet. Block 304 may be followed by block 306.

At block 306, the first wireless communication device 110 may be configured to listen for a copy of an acknowledgement in response to the current packet from the second wireless communication device 120. Block 306 may be followed by block 308.

At block 308, the first wireless communication device 110 may be configured to determine whether it has received a copy of the acknowledgement in response to the current packet from the second wireless communication device 120. If the first wireless communication device 110 has not received a copy of the acknowledgement, then block 308 may be followed by block 310. If the first wireless communication device 110 has received a copy of the acknowledgment, then block 308 may be followed by optional block 312.

At block 310, the first wireless communication device 110 may be arranged to determine if a time period $T_A$ for receiving a copy of the acknowledgment has expired. The length of the time period $T_A$ may vary depending on the Y number of copies of the acknowledgement sent by the second wireless communication device 120. The length of the time period $T_A$ may be set to allow the first wireless communication device 110 to receive the last copy of the acknowledgement sent by the second wireless communication device 120. When the time period $T_A$ has not expired, then block 310 may be followed by block 306 in which the first wireless communication device 110 may continue to listen for a copy of the acknowledgement. When the time period $T_A$ has expired, then block 310 may be followed by block 304 in which the first wireless communication device 110 may retransmit X copies of the current packet in the queue.

Optional block 312 may be used when the second wireless communication device 120 transmits Y number of copies of the acknowledgement and the first wireless communication device 110 did not receive the last copy of the acknowledgement in block 306. In optional block 312, the first wireless communication device 110 may be configured to switch to a temporary sleep mode to conserve energy. Having received a copy of the acknowledgement, the first wireless communication device 110 may be arranged to switch to the temporary sleep mode to avoid receiving any duplicative copy of the acknowledgment and consuming more resources (e.g. power, battery life, etc.). The length of the time the first wireless communication device 110 remains in the temporary sleep mode may depend in part on the copy number of the acknowledgement received in block 306 and the Y number of copies of each acknowledgement. The first wireless communication device 110 may be configured to remain in the temporary sleep mode until the last copy of the acknowledgement has been sent by the second wireless communication device 120. Block 312 may be followed by block 314.

At block 314, the first wireless communication device 110 may be configured to determine if there are one or more unsent packets remaining in the queue. When there are no unsent packets, then block 314 may be followed by block 316. When there are one or more unsent packets, then block 314 may be followed by block 318.

At block 316, the first wireless communication device 110 may be configured to stop transmitting (e.g., cease transmitting or terminate transmission) packets since there are no more packets in the queue.

At block 318, the first wireless communication device 110 may be adapted to update the status of the packets in the queue. The next packet in the queue may become the current packet in the queue. Block 318 may be followed by optional block 320.

At optional block 320, the first wireless communication device 110 may be arranged to determine X and Y on-line (i.e., in real time) using one or more of the current link conditions based on trace data, such as the current reception rates of the communication links, and send X and Y to the second wireless communication device 120 in another handshake. The first wireless communication device 110 may also be arranged to decide to optimize X and Y differently based on the current device conditions, such as the current status of the battery charge of the devices. For example, the first wireless communication device 110 may decide to optimize X and Y for energy consumption over throughput and latency based on the battery charge of the devices. Optional block 320 may loop back to block 304 in which the first wireless communication device 110 may transmit X copies of the current packet in the queue.

Figure 4:
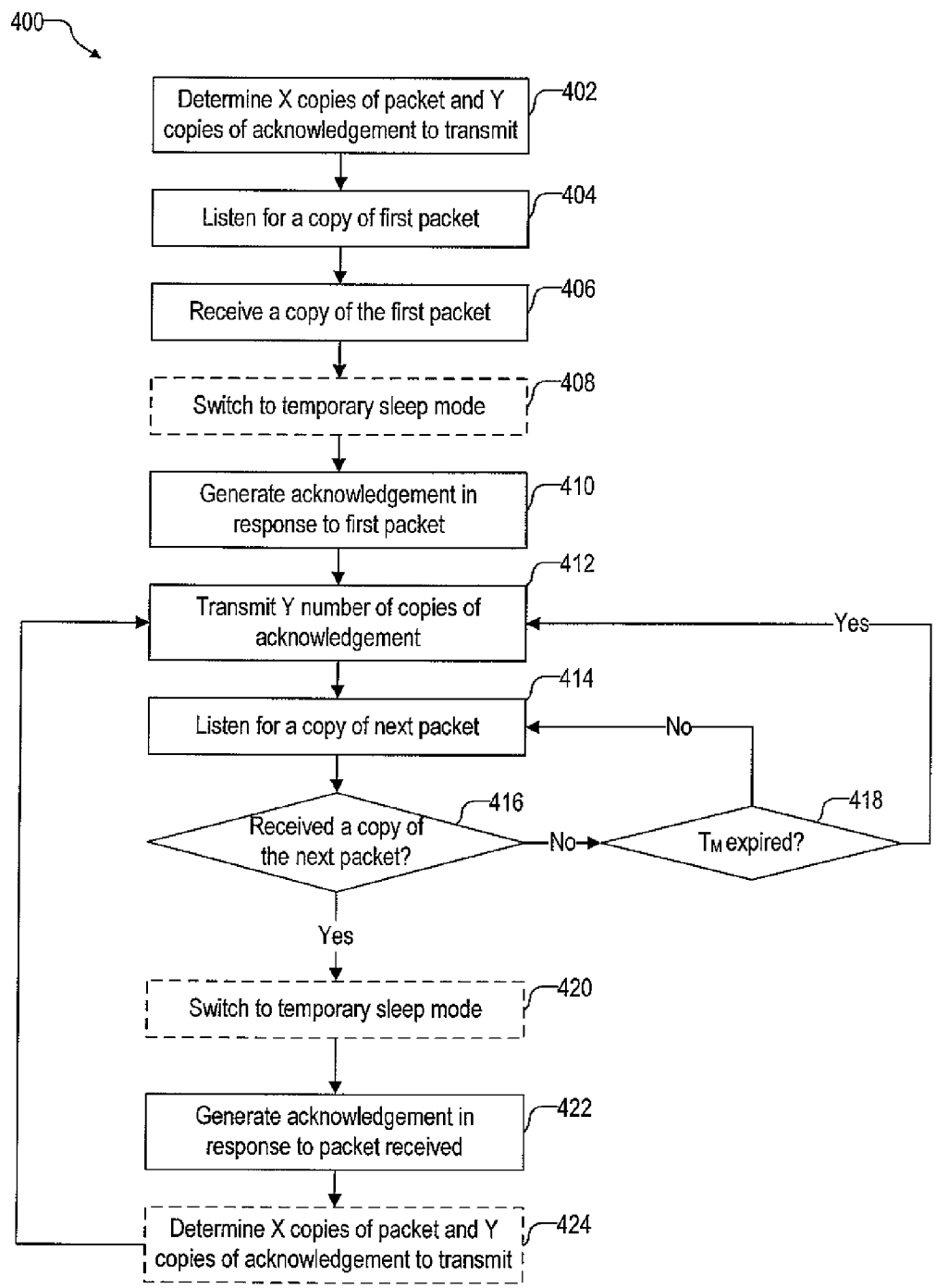
FIG. 4 is a flowchart of an example method executed by a second wireless communication device for receiving packets from a first wireless communication device using the multi-copy transmission scheme of FIGS. 1 and 2 in accordance with one or more embodiments of the present disclosure.

FIG. 4 is a flowchart of an example method 400 executed by the second wireless communication device 120 for receiving packets from the first wireless communication device 110 using the multi-copy transmission scheme of FIGS. 1 and 2 in accordance with one or more embodiments of the present disclosure. Method 400 includes one or more operations, functions or actions illustrated by blocks 402-424. Second wireless communication device 120 may be a base station or a mobile wireless device, or some other wireless communication device.

Method 400 may begin at block 402, where second wireless communication device 120 may be configured to determine X, the number of copies of the packet to be transmitted by the first wireless communication device 110, and Y, the number of copies of the acknowledgement to transmit by the second wireless communication device 120. Depending on the embodiment, the second wireless communication device 120 may be configured to determine X and Y using intensive calculations on trace data, Monte Carlo-based simulations on trace data, or by making calculations on-line (i.e., in real time) with current trace data. In addition, X and Y can be optimized for one or more of: a) throughput, b) latency, or c) energy consumption at one or both devices. The second wireless communication device 120 may be adapted to set the desired throughput, latency, and energy based on the content of the data being transmitted by the first wireless communication device 110. For example, real time playback of videos may require large throughput and low latency whereas the synchronization or the storage of files may be satisfied with lower throughput and higher latency, which then may result in lower energy consumption. The second wireless communication device 120 may be arranged to send X and Y to the first wireless communication device 110 during a handshake for setting up the communication between the two devices. Alternatively, the first wireless communication device 110 may be arranged to determine X and Y and may transmit them to the second wireless communication device 120 during the handshake. Block 402 may be followed by block 404.

At block 404, the second wireless communication device 120 may be configured to listen for a copy of the first packet from the first wireless communication device 110. Block 404 may be followed by block 406.

At block 406, the second wireless communication device 120 may be adapted to receive a copy of the first packet from the first wireless communication device 110. This block may correspond to block 304 described above. Block 406 may be followed by optional block 408.

Optional block 408 may be used when the second wireless communication device 120 does not receive the last copy of the first packet in block 406. In optional block 408, the second wireless communication device 120 may be arranged to switch to a temporary sleep mode to conserve energy. Having received a copy of the packet, the second wireless communication device 120 may switch to the temporarily sleep mode to avoid receiving any duplicative copy of the packet and consuming more resources (e.g., power, battery life, etc.). The length of the time the second wireless communication device 120 remains in the temporary sleep mode may depend on the copy number of the packet received in block 404 and the X copies of each packet. The second wireless communication device 120 may be arranged to remain in the temporary sleep mode until the last copy of the packet has been sent by the first wireless communication device 110. Block 408 may be followed by block 410.

At block 410, the second wireless communication device 120 may generate an acknowledgement in response to receiving the first packet from the first wireless communication device 110. Block 410 may be followed by block 412.

At block 412, the second wireless communication device 120 may be arranged to transmit Y copies of the acknowledgement to the first wireless communication device 110. The second wireless communication device 120 may be adapted to mark each copy with acknowledgment identifier that indicates its copy number (e.g., copy #1 out of Y, copy #y out of Y, etc.) so the first wireless communication device 110 can discern which of the copies it has received. The second wireless communication device 120 may also be configured to start a timer to track the time since transmitting the copies of the current acknowledgement. Block 412 may be followed by block 414.

At block 414, the second wireless communication device 120 may listen for the next packet from the first wireless communication device 110. Block 414 may be followed by block 416.

At block 416, the second wireless communication device 120 may be arranged to determine if it has received the next packet from the first wireless communication device 110. When the second wireless communication device 120 has not received the next packet, then block 416 may be followed by block 418. When the second wireless communication device 120 has received the next packet, then block 416 may be followed by optional block 420.

At block 418, the second wireless communication device 120 may be arranged to determine if a time period $T_M$ for receiving the next packet has expired. The length of the time period $T_M$ may vary depending on the X copies of each packet sent by the first wireless communication device 110. The length of the time period $T_M$ may be set to allow the second wireless communication device 120 to receive the last copy of the next packet sent by the first wireless communication device 110. When the time period $T_M$ has not expired, then block 418 may be followed by block 414 in which the second wireless communication device 120 may continue to listen for the next packet. When the time period $T_M$ has expired, then block 418 may be followed by block 412 in which the second wireless communication device 120 may retransmit Y copies of the acknowledgement.

Optional block 420 may be used when the second wireless communication device 120 does not receive the last copy of the next packet in block 416. In optional block 420, the second wireless communication device 120 may be arranged to switch to a temporary sleep mode to conserve energy. Having received a copy of the packet, the second wireless communication device 120 may switch to the temporary sleep mode to avoid receiving any duplicative copy the packet. The length of the time the second wireless communication device 120 remains in the temporary sleep mode may depend on the copy number of the packet received in block 416 and the X copies of each packet. The second wireless communication device 120 may be arranged to remain in the temporary sleep mode until the last copy of the packet has been sent by the first wireless communication device 110. Block 420 may be followed by block 422.

At block 422, the second wireless communication device 120 may be arranged to generate an acknowledgement in response to the packet received from the first wireless communication device 110. Block 422 may be followed by optional block 424.

At optional block 424, the second wireless communication device may be arranged to determine X and Y on-line (i.e., in real time) using one or more of the current communication link conditions based on trace data, such as the current reception rates of the communication links, and send X and Y to the first wireless communication device 110 in another handshake. The second wireless communication device 120 may also decide to optimize X and Y differently based on the current device conditions, such as the current status of the battery charge of the devices. For example, the second wireless communication device 120 may decide to optimize X and Y for energy consumption over throughput and latency based on the battery charge of the devices. Optional block 424 may loop back to block 412, where the second wireless communication device 120 may transmit Y copies of the new acknowledgment.

Figures 5, 6:
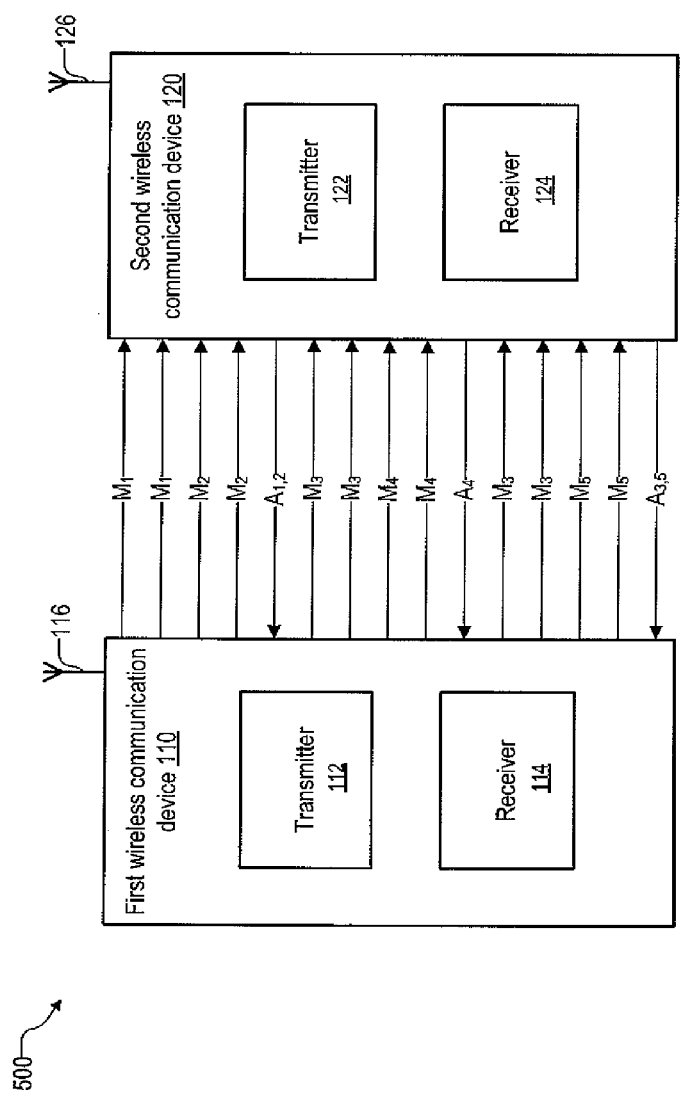
FIG. 5 illustrates an example of a multi-copy transmission scheme using batched acknowledgments in a wireless communication system in accordance with one or more embodiments of the present disclosure.
FIG. 6 illustrates a table of example actions undertaken by the wireless communication devices in FIG. 5 in each time epoch in accordance with one or more embodiments of the present disclosure.

FIG. 5 illustrates an example of the multi-copy transmission scheme 500 using batched acknowledgments in a wireless communication system in accordance with some embodiments of the present disclosure. Similar to scheme 100, scheme 500 includes first wireless communication device 110 and second wireless communication device 120 as described above.

In operation, two sequentially transmitted packets and one batched acknowledgement for the two packets may be transmitted in each communication session. The nomenclature for the packets and the acknowledgements are explained above for FIG. 1 and are not repeated here.

FIG. 6 illustrates a table of example actions undertaken by wireless communication devices 110 and 112 in FIG. 5 in each time epoch. Each illustrated communication session may take five time epochs (i.e., four packet transmissions plus one acknowledgement transmission). Three different example communication sessions are illustrated by the examples in FIGS. 5 and 6. The first example communication session is illustrated as packets $M_1$ and $M_2$ with batched acknowledgement $A_{1,2}$. The second example communication session is illustrated as packets $M_3$ and $M_4$ with batched acknowledgement $A_4$. The third example communication session is illustrated as packets $M_3$ and $M_5$ with batched acknowledgement $A_{3,5}$.

In example time epochs 1 and 2, the first wireless communication device 110 transmits two copies of packet $M_1$ to the second wireless communication device 120. The second wireless communication device 120 receives the first copy of packet $M_1$ in example time epoch 1. In response, the second wireless communication device 120 enters into a temporary sleep mode in example time epoch 2 to save power as it does not need to listen for the second copy of packet $M_1$, since the first copy of the packet was successful received.

In example time epochs 3 and 4, the first wireless communication device 110 transmits two copies of packet $M_2$ to the second wireless communication device 120. In example time epoch 3, the second wireless communication device 120 wakes up and listens for but does not receive the first copy of packet $M_2$. In example time epoch 4, the second wireless communication device 120 receives the second copy of packet $M_2$.

In example time epoch 5, the second wireless communication device 120 transmits a batched acknowledgement $A_{1,2}$, which is received by the first wireless communication device 110.

In example time epochs 6 and 7, the first wireless communication device 110 transmits two copies of packet $M_3$ to the second wireless communication device 120. However, the second wireless communication device 120 does not receive either copy of packet $M_3$.

In example time epochs 8 and 9, the first wireless communication device 110 transmits two copies of packet $M_4$ to the second wireless communication device 120. In example time epoch 8, the second wireless communication device 120 receives the first copy of packet $M_4$. In response, the second wireless communication device 120 buffers packet $M_4$ in a queue and enters into the temporary sleep mode in example time epoch 9 to save power as it does not need to listen for the second copy of packet $M_4$.

In example time epoch 10, the second wireless communication device 120 transmits a batched acknowledgement $A_4$, which is received by the first wireless communication device 110. Batched acknowledgement $A_4$ indicates or implies to the first wireless communication device 110 that the second wireless communication device 120 has not received packet $A_3$.

In example time epochs 11 and 12, the first wireless communication device 110 retransmits two copies of packet $M_3$ to the second wireless communication device 120. The second wireless communication device 120 receives the second copy of packet $M_3$ in example time epoch 12 and places the packet before packet $M_4$ in the queue.

In example time epochs 13 and 14, the first wireless communication device 110 transmits two copies of packet $M_5$, the next packet in the queue, to the second wireless communication device 120. The second wireless communication device 120 receives the second copy of packet $M_5$ in example time epoch 14.

In example time epoch 15, the second wireless communication device 120 transmits a batched acknowledgement $A_{3,5}$, which is received by the first wireless communication device 110.

Figure 7:
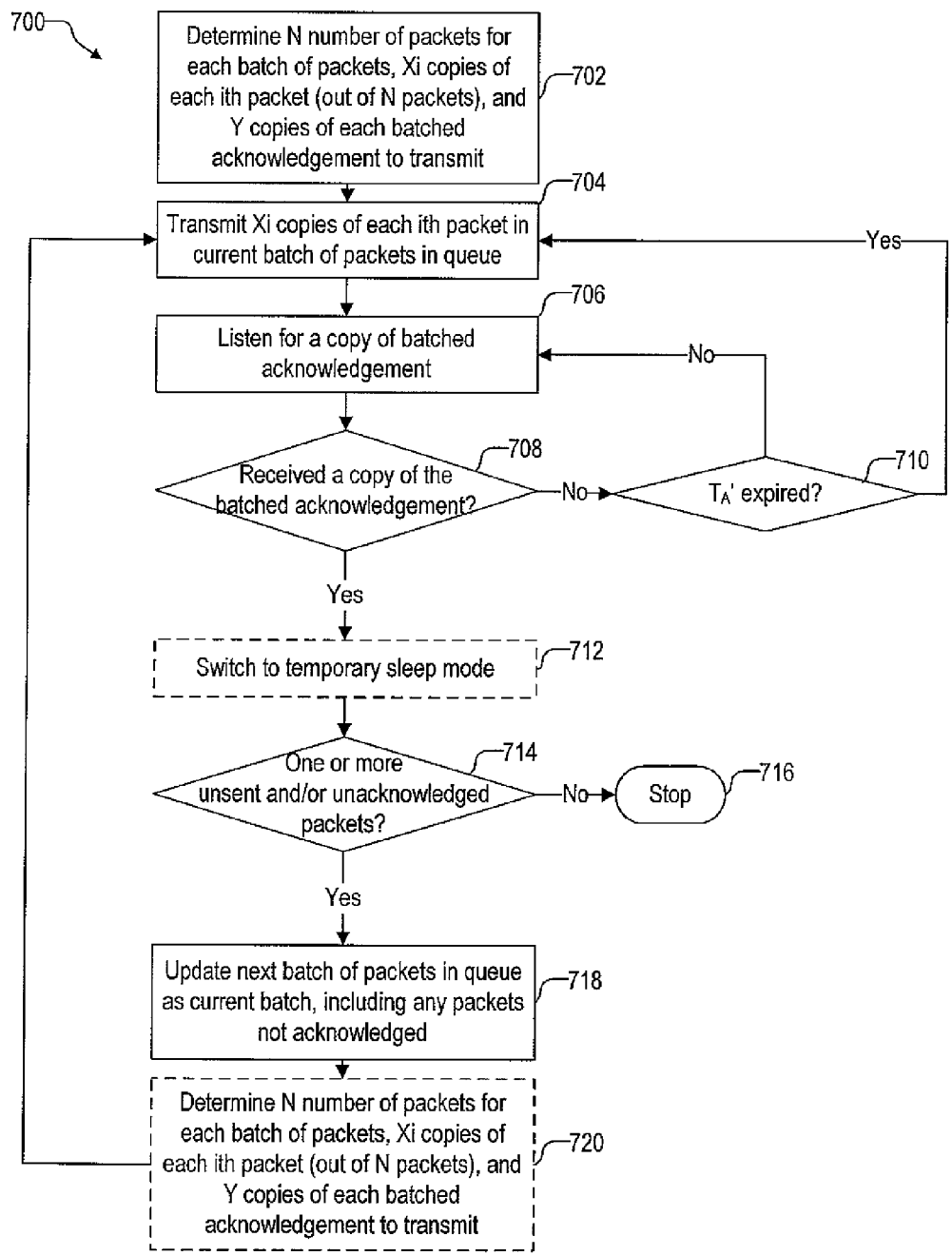
FIG. 7 is a flowchart of an example method executed by a first wireless communication device for transmitting packets to a second wireless communication device using the multi-copy transmission scheme of FIGS. 5 and 6 in accordance with one or more embodiments of the present disclosure.

FIG. 7 is a flowchart of an example method 700 executed by the first wireless communication device 110 for transmitting packets to the second wireless communication 120 device using the multi-copy transmission scheme of FIGS. 5 and 6 in accordance with one or more embodiments of the present disclosure. Method 700 includes one or more operations, functions, or actions illustrated by blocks 702-720. The first wireless communication device 110 may be a base station, a mobile wireless device, or some other wireless communication device.

Method 700 may begin at block 702, where the first wireless communication device 110 may determine N, the number of packets for each batch of packets to transmit to the second wireless communication device 120, $X_1$, the number of copies of each ith packet (out of N packets) to be transmit by the first wireless communication device 110, and Y, the number of copies of each batched acknowledgement to be transmitted by the second wireless communication device 120. In the example shown in FIGS. 5 and 6, N is 2, $X_1$ and $X_2$ are both 2, and Y is 1. $X_1$ and $X_2$ may be different numbers in order to keep the total number of copies down and the buffer for storing out of order packets small. In some embodiments, one or more of N and $X_i$ is two or more. Theoretically, number N is unlimited but the practical limit in some examples may be approximately five packets.

Depending on the specific embodiment, the first wireless communication device 110 may be configured to optimize N, $X_1$ to $X_N$, and Y using intensive calculations on trace data, Monte Carlo-based simulations on trace data, or by making calculations on-line (i.e., real time) with current trace data. The first wireless communication device 110 may be arranged to send N, $X_1$ to $X_N$, and Y to the second wireless communication device 120 during a handshake for setting up the communication between the two devices. Alternatively, the second wireless communication device 120 may determine N, $X_1$ to $X_N$, and Y and transmit the determined values to the first wireless communication 110 device during the handshake. Block 702 may be followed by block 704.

At block 704, the first wireless communication device 110 may transmit Xi copies of each ith packet in the current batch of N packets in a queue to the second wireless communication device 120. The first wireless communication device 110 may be configured to mark each copy of the packets with a packet identifier that indicates its batch number, packet number, and copy number (e.g., batch #1, packet #1, copy #1 out of $X_i$) so that the second wireless communication device 120 can discern which of the copies it has received. The first wireless communication device 110 may also be configured to start a timer to track the time since transmitting the current batch of packets. Block 704 may be followed by block 706.

At block 706, the first wireless communication device 110 may be configured to listen for a copy of a batched acknowledgement in response to the current batch of packets from the second wireless communication device 120. Block 706 may be followed by block 708.

At block 708, the first wireless communication device 110 may be configured to determine if it has received a copy of the batched acknowledgement in response to the current batch of packets. When the first wireless communication device 110 has not received a copy of the batched acknowledgement, then block 708 may be followed by block 710. When the first wireless communication device 110 has received a copy of the batched acknowledgment, then block 708 may be followed by optional block 712.

At block 710, the first wireless communication device may be configured to determine if a time period $T_A'$ for receiving a copy of the batched acknowledgment has expired. The length of the time period $T_A'$ may vary depending on the Y number of copies of the batched acknowledgement sent by the second wireless communication device 120. The length of the time period $T_A'$ may be set to allow the first wireless communication device 110 to receive the last copy of the batched acknowledgement sent by the second wireless communication device 120. When the time period $T_A'$ has not expired, then block 710 may be followed by block 706 in which the first wireless communication device 110 may continue to listen for a copy of the batched acknowledgement. When the time period $T_A'$ has expired, then block 710 may be followed by block 704 in which the first wireless communication device 110 may retransmit $X_i$ copies of each ith packet in the current batch of N packets in the queue.

Optional block 712 may be used when the second wireless communication device 120 transmits Y copies of the batched acknowledgement and the first wireless communication device 110 fails to receive the last copy of the batched acknowledgement in block 706. In optional block 712, the first wireless communication device 110 may be arranged to switch to a temporary sleep mode to conserve energy. Having received a copy of the acknowledgement, the first wireless communication device 110 may be configured to switch to the temporary sleep mode to avoid receiving any duplicative copy of the batched acknowledgment and consuming more resources (e.g. power, battery life, etc.). The length of the time the first wireless communication device 110 remains in the temporary sleep mode may depend in part on the copy number of the batched acknowledgement received in block 708 and the Y number of copies of each acknowledgement. The first wireless communication device 110 may be configured to remain in the temporary sleep mode until the last copy of the batched acknowledgement has been sent by the second wireless communication device 120. Block 712 may be followed by block 714.

At block 714, the first wireless communication device 110 may be configured to determine if there are one or more unsent packets remaining in the queue and/or one or more packets unacknowledged in the last received batched acknowledgment. When there are no unsent packet and no unacknowledged packet, then block 714 may be followed by block 716. When there are one or more unsent packets and/or one or more unacknowledged packets, then block 714 may be followed by block 718.

At block 716, the first wireless communication device 110 may be arranged to stop transmitting (e.g., cease transmitting or terminate transmission) packets since there are no more unsent packet in the queue or unacknowledged packet from the last transmitted batch of packets.

At block 718, the first wireless communication device 110 may be arranged to update the status of the batches of packets in the queue. The next batch in the queue may become the current batch in the queue. The next batch may include one or more packets unacknowledged in the last received batched acknowledgment. Block 718 may be followed by optional block 720.

At optional block 720, the first wireless communication device 110 may be arranged to determine N, $X_i$, and Y on-line (i.e., in real time) using one or more of the current link conditions based on trace data, such as the current reception rates of the communication links, and send N, $X_1$ to $X_N$, and Y to the second wireless communication device 120 in another handshake. The first wireless communication device 110 may also decide to optimize N, $X_1$ to $X_N$, and Y differently based on the current device conditions, such as the current status of the battery charge of the devices. For example, the first wireless communication device 110 may decide to optimize N, $X_1$ to $X_N$, and Y for energy consumption over throughput and latency based on the battery charge of the devices. Optional block 720 may loop back to block 704 in which the first wireless communication device 110 may transmit $X_i$ copies of each ith packet in the current batch of N packets in the queue.

Figure 8A:
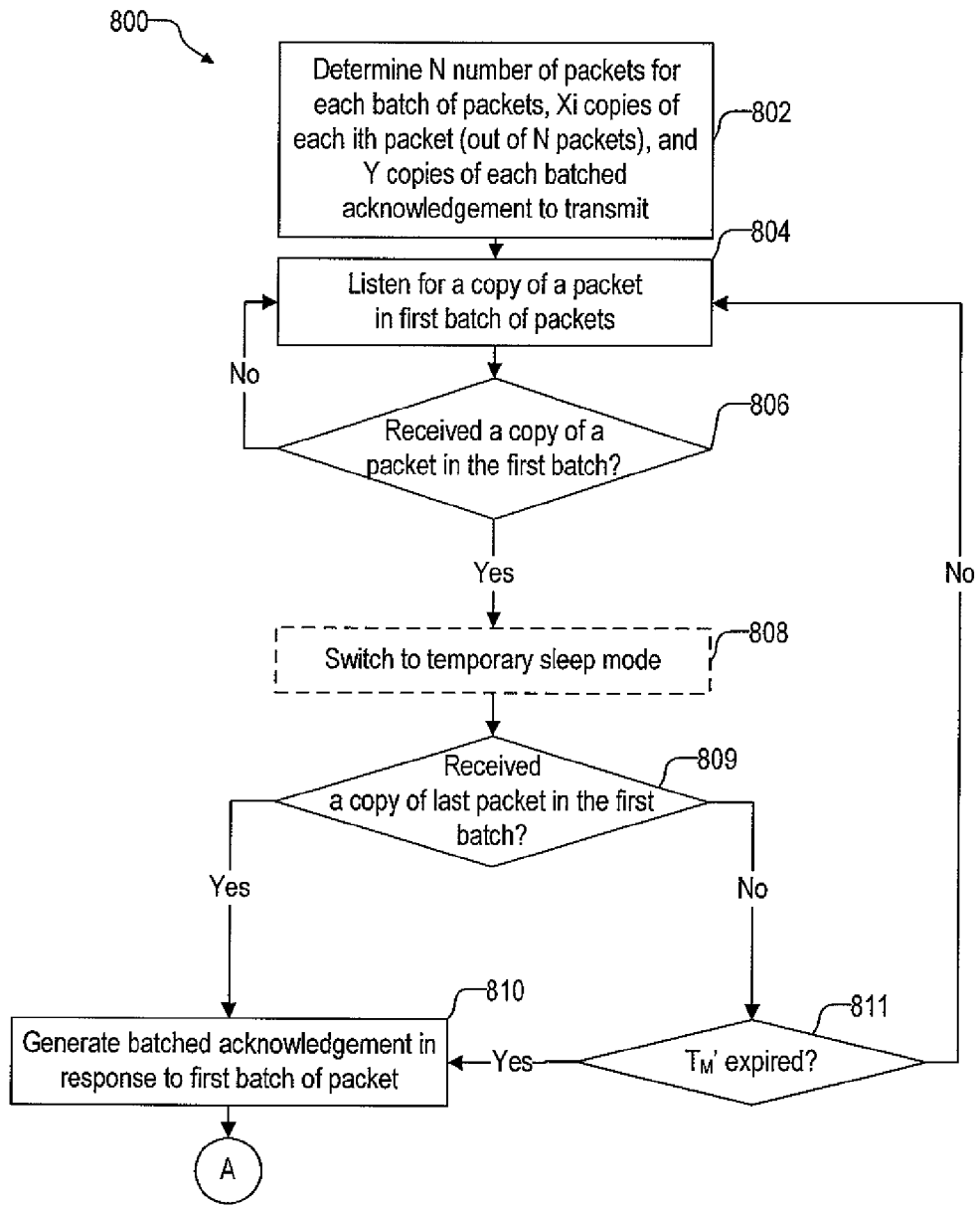
FIGS. 8A and 8B are a flowchart of an example method executed by a second wireless communication device for receiving packets from a first wireless communication device using the multi-copy transmission scheme of FIGS. 5 and 6 in accordance with one or more embodiments of the present disclosure.
Figure 8B:
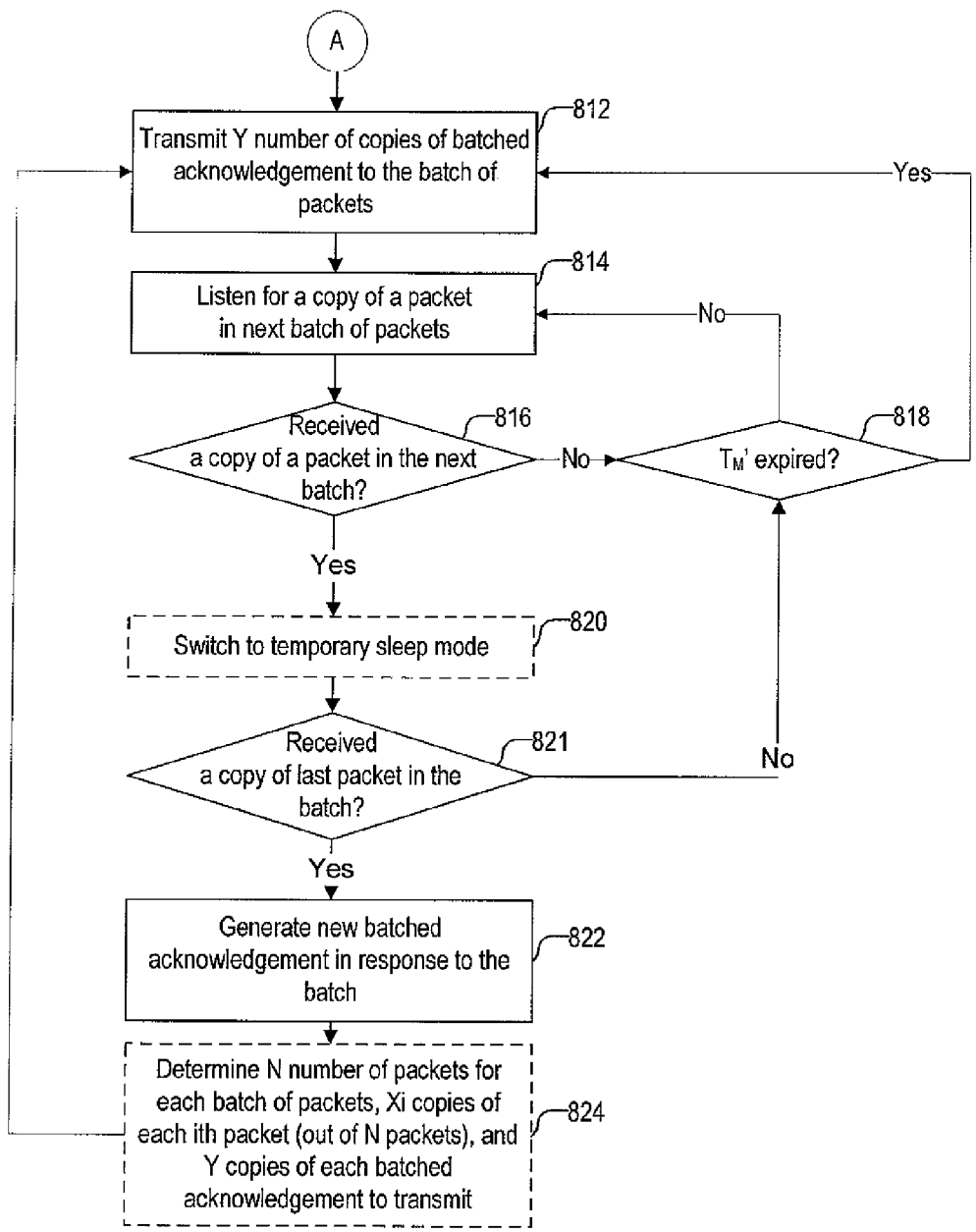

FIGS. 8A and 8B are a flowchart of an example method 800 executed by the second wireless communication device 120 for receiving packets from the first wireless communication device 110 using the multi-copy transmission scheme of FIGS. 5 and 6 in accordance with one or more embodiments of the present disclosure. Method 800 includes one or more operations, functions or actions illustrated by blocks 802-824. Second wireless communication device 120 may be a base station or a mobile wireless device, or some other wireless communication device.

Referring to FIG. 8A, method 800 may begin at block 802, where the second wireless communication device 120 may be configured to determine N, the number of packets per batch to transmit to the second wireless communication device 120, the $X_i$, the number of copies of the ith packet (out of N packets) to be transmitted by the first wireless communication device 110, and Y, the number of copies of the acknowledgement to be transmitted by the second wireless communication device 120. Depending on the embodiment, the second wireless communication device 120 may be arranged to optimize N, $X_1$ to $X_N$, and Y using intensive calculations on trace data, Monte Carlo-based simulations on trace data, or by making calculations on-line (i.e., in real time) with current trace data. The second wireless communication device 120 may be arranged to send N, $X_1$ to $X_N$, and Y to the first wireless communication device 110 during a handshake for setting up the communication between the two devices. Alternatively, the first wireless communication device 110 may be arranged to determine N, $X_1$ to $X_N$, and Y and may transmit them to the second wireless communication device 120 during the handshake. Block 802 may be followed by block 804.

At block 804, the second wireless communication device 120 may be adapted to listen for a copy of a packet in a first batch of packets from the first wireless communication device 110. Block 804 may be followed by block 806.

At block 806, the second wireless communication device 120 may be arranged to determine if it has received a copy of a packet in the first batch of packets from the first wireless communication device 110. When the second wireless communication device 120 has not received a copy of a packet in the first batch, then block 806 may be followed by block 804. When the second wireless communication device 120 has received a copy of a packet in the first batch, then block 806 may be followed by optional block 808.

Optional block 808 may be used when the second wireless communication device 120 does not receive the last copy of the packet in block 804. In optional block 808, the second wireless communication device 120 may be arranged to switch to a temporary sleep mode to conserve energy. Having received a copy of a packet, the second wireless communication device 120 may switch to the temporary sleep mode to avoid receiving any duplicative copy of the packet and consuming more resources (e.g., power, battery life, etc.). The length of the time the second wireless communication device 120 remains in the temporary sleep mode may depend on the copy number of the packet received in block 806 and the $X_i$ number of copies of each ith packet (out of N packets). The second wireless communication device 120 may be configured to remain in the temporary sleep mode until the last copy of the packet has been sent by the first wireless communication device 110. Block 808 may be followed by block 810.

In block 809, the second wireless communication device 120 may be arranged to determine if it has received a copy of the last packet in the first batch of packets. When the second wireless communication device 120 has not received a copy of the last packet in the first batch, then block 809 may be followed by block 810. When the second wireless communication device 120 has received a copy of the last packet in the first batch, then block 809 may be followed by optional block 811.

At block 810, the second wireless communication device 120 may be arranged to generate a batched acknowledgement in response to receiving one or more packets in the first batch of packets from the first wireless communication device 110. The batched acknowledgment may indicate the packets received and/or the packets that were not received. Block 810 may be followed by block 812 on FIG. 8A.

At block 811, the second wireless communication device 120 may be arranged to determine if a time period $T_M{'}$ for receiving the current batch of packets has expired. The length of the time period $T_M{'}$ may vary depending on the N number of packets per batch of packets and $X_i$ copies of each ith packet (out of N packets) sent by the first wireless communication device 110. The length of the time period $T_M{'}$ may be set to allow the second wireless communication device 120 to receive the last copy of the last packet in the current batch of packets sent by the first wireless communication device 110. When the time period $T_M{'}$ has not expired, then block 811 may be followed by block 804 in which the second wireless communication device 120 may continue to listen for a copy of a packet in the first batch of packets. When the time period $T_M{'}$ has expired, then block 811 may be followed by block 810 in which the second wireless communication device 120 may generate the batched acknowledgement for the current batch of packets.

Referring to FIG. 8B, at block 812, the second wireless communication device 120 may be arranged to transmit Y copies of the batched acknowledgement to the first wireless communication device. The second wireless communication device 120 may be adapted to mark each copy with acknowledgment identifier that indicates its copy number (e.g., copy #1 out of Y, copy #y out of Y, etc.) so the first wireless communication device 110 can discern which of the copies it has received. The second wireless communication device 120 may also be arranged to start a timer to track the time since transmitting the copies of the current batched acknowledgement. Block 812 may be followed by block 814.

At block 814, the second wireless communication device 120 may be adapted to listen for a copy of a packet in the next batch of packets from the first wireless communication device 110. Block 814 may be followed by block 816.

At block 816, the second wireless communication device 120 may be arranged to determine if it has received a copy of a packet in the next batch of packets from the first wireless communication device 110. When the second wireless communication device 120 has not received a copy of a packet in the next batch, then block 816 may be followed by block 818. When the second wireless communication device 120 has received a copy of a packet in the next batch, then block 816 may be followed by optional block 820.

At block 818, the second wireless communication device 120 may be arranged to determine if the time period $T_M{'}$ for receiving the current batch of packets has expired. When the time period $T_M{'}$ has not expired, then block 818 may be followed by block 814 in which the second wireless communication device 120 may continue to listen for the a copy of a packet in the current batch of packets. When the time period $T_M{'}$ has expired, then block 818 may be followed by block 812 in which the second wireless communication device 120 may retransmit Y copies of the last batched acknowledgement.

Optional block 820 may be used when the second wireless communication device 120 does not receive the last copy of a packet in the current batch of packets in block 816. In optional block 820, the second wireless communication device 120 may be arranged to switch to a temporary sleep mode to conserve energy. The length of the time the second wireless communication device 120 remains in the temporary sleep mode may depend on the copy number of the packet received in block 816 and the Xi number of copies of each ith packet (out of N packets). The second wireless communication device 120 may be arranged to remain in the temporary sleep mode until the last copy of the packet has been sent by the first wireless communication device 110. Block 820 may be followed by block 821.

At block 821, the second wireless communication device 120 may be arranged to determine if it has received a copy of the last packet in the current batch of packets in block 816. When the second wireless communication device 120 has not received a copy of the last packet in the current batch, then block 821 may be followed by block 818. When the second wireless communication device 120 has received a copy of the last packet in the current batch, then block 821 may be followed by optional block 822.

At block 822, the second wireless communication device 120 may be arranged to generate a batched acknowledgement in response to receiving one or more packets in the current batch of packets from the first wireless communication device 110. The batched acknowledgment may indicate the packets received and/or the packets that were not received. Block 822 may be followed by optional block 824.

At optional block 824, the second wireless communication device may be arranged to determine N, $X_i$, and Y on-line (i.e., in real time) using one or more of the current communication link conditions based on trace data, such as the current reception rates of the communication links, and send N, $X_1$ to $X_N$, and Y to the first wireless communication device 110 in another handshake. The second wireless communication device 120 may also decide to optimize N, $X_1$ to $X_N$, and Y differently based on the current device conditions, such as the current status of the battery charge of the devices. For example, the second wireless communication device 120 may decide to optimize N, $X_1$ to $X_N$, and Y for energy consumption over throughput and latency based on the battery charge of the devices. Optional block 824 may loop back to block 812, where the second wireless communication device 120 may transmit Y copies of the new batched acknowledgment.

Figure 9:
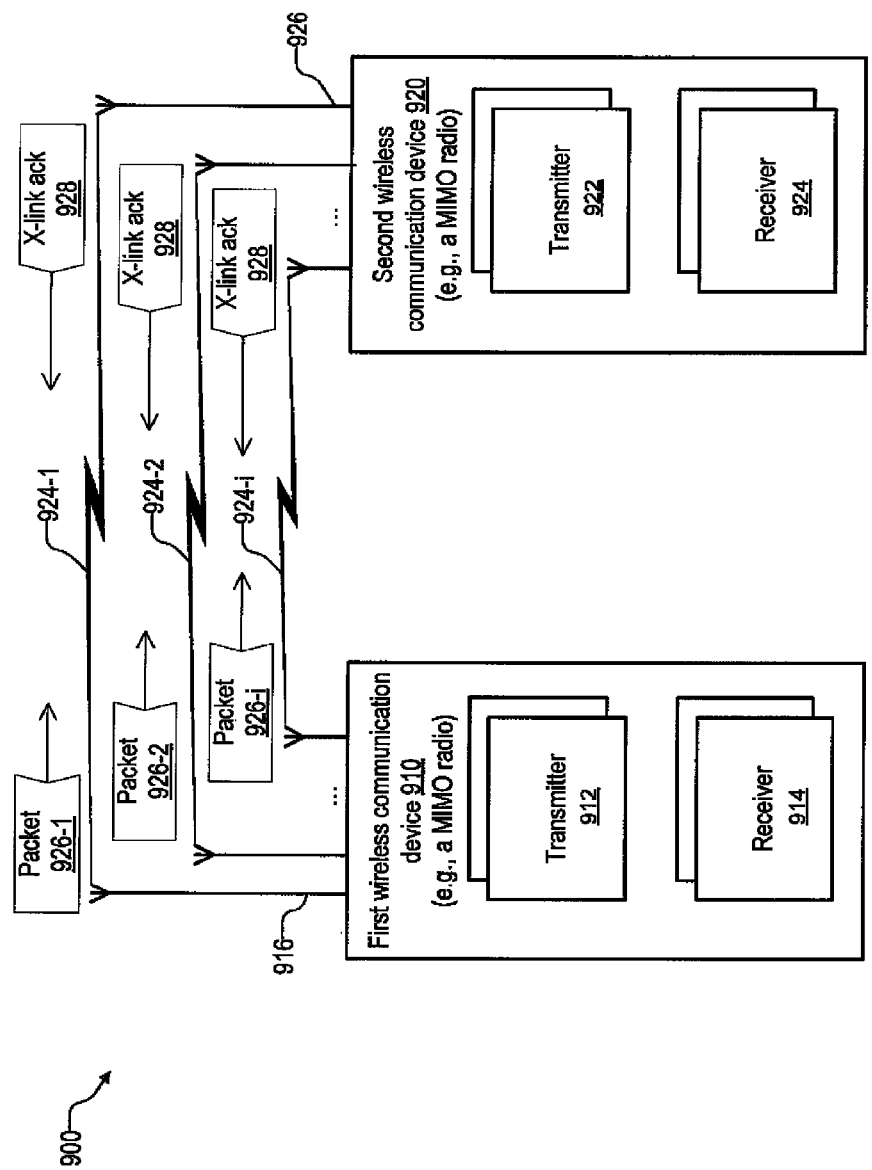
FIG. 9 illustrates examples of the multi-copy transmission scheme for transmitting packets in a MIMO (Multiple Input Multiple Output) wireless communication system in accordance with one or more embodiments of the present disclosure.

FIG. 9 illustrates an example of the multi-copy transmission scheme 900 in a MIMO (Multiple Input Multiple Output) wireless communication system in accordance with one or more embodiments of the present disclosure. Scheme 900 includes a first wireless communication device 910 with transmitters 912, receivers 914, and a first array of antennas 916. Scheme 900 also includes a second wireless communication device 920 with transmitters 922, receivers 924, and a second array of antennas 926. The first wireless communication device 910 and the second wireless communication device 920 may be configured to establish bidirectional wireless communication links 924-1 to 924-i (collectively "wireless communication links 924") between the devices.

To increase bandwidth, the first wireless communication device 910 may be arranged to transmit packets 926-1, 926-2, and 926-i over respective wireless communication links 924-1, 924-2, and 924-i to the second wireless communication device 920. To improve the probability that the first wireless communication device 910 will receive acknowledgment from the second wireless communication device 920, the second wireless communication device 920 may be arranged to transmit the same cross-link acknowledgment 928 over wireless communication links 924 to the first wireless communication device 910. The cross-link acknowledgment 928 may indicate the packets received over wireless communication links 924 and/or the packets that were not received over wireless communication links 924. For each wireless communication link, the cross-link acknowledgement 928 may acknowledge one packet as described above in the scheme of FIGS. 1 to 4 or one or more packets in a batch of packets as described above in the scheme of FIGS. 5 to 8B.

To improve reliability over two wireless communication links with poor reception rates, the first wireless communication device 910 may be arranged to transmit the same packet over the two links to the second wireless communication device 920. If a third wireless communication links with good reception rate is available, the first wireless communication device 910 may be arranged to transmit two different packets over the two poor links and an XOR result of the two packets over the good link to the second wireless communication device 920. The XOR result on the good link may allow the second wireless communication device 920 to recover one packet as long as the other packet is received correctly.

FIG. 10 illustrates a table of example actions that may be undertaken by wireless communication devices 910 and 912 over wireless communication links 924-1 and 924-2 in FIG. 9, where a cross-link acknowledgement acknowledges one packet per link in one or more embodiments of the present disclosure. Each illustrated communication session may take three time epochs (i.e., two packet transmissions plus one acknowledgement transmission). One example communication session is illustrated in FIG. 10. The example communication session is illustrated as packets $M_1$ and $M_2$ with cross-link acknowledgement $A_1$.

In example time epochs 1 and 2, the first wireless communication device 910 may transmit two copies of packet $M_1$ to the second wireless communication device 920 over wireless communication link 924-1. Also in example time epochs 1 and 2, the first wireless communication device 910 may transmit two copies of packet $M_2$ to the second wireless communication device 920 over wireless communication link 924-2.

In example time epoch 1, the second wireless communication device 920 may receive the first copy of packet $M_1$ over wireless communication link 924-1. In response, the second wireless communication device 920 may configure its receiver 914 for wireless communication link 924-1 into a temporary sleep mode in example time epoch 2 to save power as it does not need to listen for the second copy of packet $M_1$, since the first copy of the packet was successful received. In example time epochs 1 and 2, the second wireless communication device 120 may listen for but does not receive either copy of packet $M_2$ over wireless communication link 924-2.

In example time epoch 3, the second wireless communication device 920 may transmit a cross-link acknowledgement $A_1$ over wireless communication links 924-1 and 924-2, which may be received by the first wireless communication device 910 over wireless communication link 924-2. Cross-link acknowledgment $A_1$ may indicate to the first wireless communication device 910 that packet $M_2$ was not received and may be retransmitted.

FIG. 11 illustrates a table of example actions that may be undertaken by wireless communication devices 910 and 912 over wireless communication links 924-1 and 924-2 in FIG. 9, where a cross-link batched acknowledgement acknowledges two packets per link in one or more embodiments of the present disclosure. Each illustrated communication session may take five time epochs (i.e., four packet transmissions plus one acknowledgement transmission). One example communication sessions is illustrated in FIG. 11. The example communication session is illustrated as packets $M_1$, $M_2$, $M_3$, and $M_4$ with cross-link batched acknowledgement $A_{1,3,4}$.

In example time epochs 1 and 2, the first wireless communication device 910 may transmit two copies of packet $M_1$ to the second wireless communication device 920 over wireless communication link 924-1. Also in example time epochs 1 and 2, the first wireless communication device 910 may transmit two copies of packet $M_2$ to the second wireless communication device 920 over wireless communication link 924-2.

In example time epoch 1, the second wireless communication device 920 may receive the first copy of packet $M_1$ over wireless communication link 924-1. In response, the second wireless communication device 920 may configure its receiver 924 for wireless communication link 924-1 into a temporary sleep mode in example time epoch 2 to save power as it does not need to listen for the second copy of packet $M_1$, since the first copy of the packet was successful received. In example time epochs 1 and 2, the second wireless communication device 120 may listen for but does not receive either copy of packet $M_2$ over wireless communication link 924-2.

In example time epochs 3 and 4, the first wireless communication device 910 may transmit two copies of packet $M_3$ to the second wireless communication device 920 over wireless communication link 924-1. Also in example time epochs 1 and 2, the first wireless communication device 910 may transmit two copies of packet $M_4$ to the second wireless communication device 920 over wireless communication link 924-2.

In example time epoch 3, the second wireless communication device 920 may receive the first copy of packet $M_4$ over wireless communication link 924-2. In response, the second wireless communication device 920 may configure its receiver 924 for wireless communication link 924-2 into a temporary sleep mode in example time epoch 4 to save power as it does not need to listen for the second copy of packet $M_1$, since the first copy of the packet was successful received. In example time epoch 4, the second wireless communication device 120 may receive the second copy of packet $M_3$ over wireless communication link 924-1.

In example time epoch 5, the second wireless communication device 920 may transmit a cross-link batched acknowledgement $A_{1,3,4}$ over wireless communication links 924-1 and 924-2, which may be received by the first wireless communication device 910 over wireless communication link 924-2. Cross-link acknowledgment $A_{1,3,4}$ may indicate to the first wireless communication device 910 that packet $M_2$ should be retransmitted.

Figure 12:
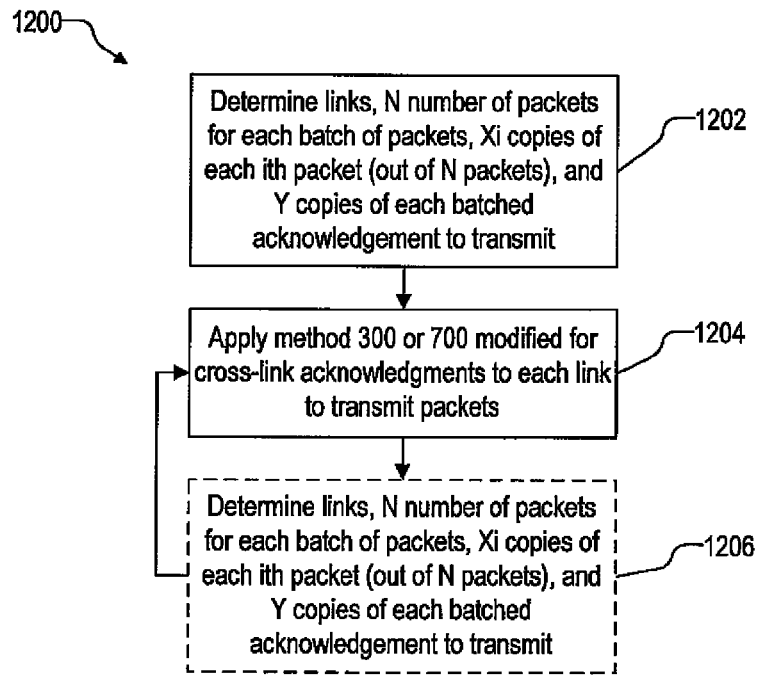
FIG. 12 is a flowchart of an example method executed by a first wireless communication device for sending packets to a second wireless communication device using the scheme of FIG. 10 or 11 in accordance with one or more embodiments of the present disclosure.

FIG. 12 is a flowchart of an example method 1200 executed by the first wireless communication device 910 for sending packets to the second wireless communication device 920 using the scheme of FIG. 10 or 11 in accordance with one or more embodiments of the present disclosure. Method 1200 includes one or more operations, functions or actions illustrated by blocks 1202-1206. First wireless communication device 910 may be a base station or a mobile wireless device, or some other wireless communication device.

At block 1202, the first wireless communication device 910 may determine which of wireless communication links 924 to use to communicate with the second wireless communication device 120, the number N of packets for each batch of packets to transmit to the second wireless communication device 120, the number Xi of copies of each ith packet (out of N packets) to be transmitted by the first wireless communication device 910, and the number Y of copies of each acknowledgement to be transmitted by the second wireless communication device 920. In the example shown in FIG. 10, N is 1, $X_1$ is 2, and Y is 1. In the example shown in FIG. 11, N is 2, $X_1$ and $X_2$ are both 2, and Y is 1. Note that $X_1$ and $X_2$ may be different numbers in order to keep the total number of copies down and the buffer for storing out of order packets small. In some embodiments, one or more of N and $X_i$ is two or more.

Depending on the embodiment, the first wireless communication device 910 may be arranged to optimize these parameters using intensive calculations on trace data, Monte Carlo-based simulations on trace data, or by making calculations on-line (i.e., in real time) with current trace data. The first wireless communication device 910 may be arranged to send these parameters to the second wireless communication device 920 during a handshake for setting up the communication between the two devices. Alternatively, the second wireless communication device 920 may be arranged to determine these parameters and may transmit them to the first wireless communication device 910 during the handshake. Block 1202 may be followed by block 1204.

At block 1204, the first wireless communication device 910 may be configured to apply method 300 modified for cross-link acknowledgments for the scheme shown in FIG. 10. In the modified method 300, block 302 and optional block 320 may be replaced by blocks 1202 described above and optional block 1206 described below, respectively. The remainder of the blocks in method 300 may be applied to each wireless communication link, and block 308 may be modified so that the first wireless communication device 910 may determine if a copy of the cross-link acknowledgement has been received over any of the wireless communication links 924 as any copy of the cross-link acknowledgment would indicate the packets that should be retransmitted.

Alternatively, the first wireless communication device 910 may be configured to apply method 700 modified for cross-link batched acknowledgments for the scheme shown in FIG. 11. In the modified method 700, block 702 and optional block 720 may be replaced by blocks 1202 described above and optional block 1206 described below. The remainder of the blocks in method 700 may be applied to each wireless communication link, and block 708 may be modified so that the first wireless communication device 910 may determine if a copy of the cross-link batched acknowledgement has been received over any of the wireless communication links 924 as any copy of the cross-link batched acknowledgment would indicate the packets that should be retransmitted. Block 1204 may be followed by optional block 1206.

At optional block 1206, the first wireless communication device 910 may be arranged to determine the link selection, N, $X_i$, and Y on-line (i.e., in real time) using one or more of the current link conditions based on trace data, such as the current reception rates of the wireless communication links, and send the parameters to the second wireless communication device 920 in another handshake. The first wireless communication device 910 may also be arranged to decide to optimize the link selection, N, $X_1$ to $X_N$, and Y differently based on the current device conditions, such as the current status of the battery charge of the devices. For example, the first wireless communication device 910 may decide to optimize the link selection, N, $X_1$ to $X_N$, and Y for energy consumption over throughput and latency based on the battery charge of the devices. Optional block 1206 may loop back to block 1204 in which the first wireless communication device 910 may transmit packets.

Figure 13:
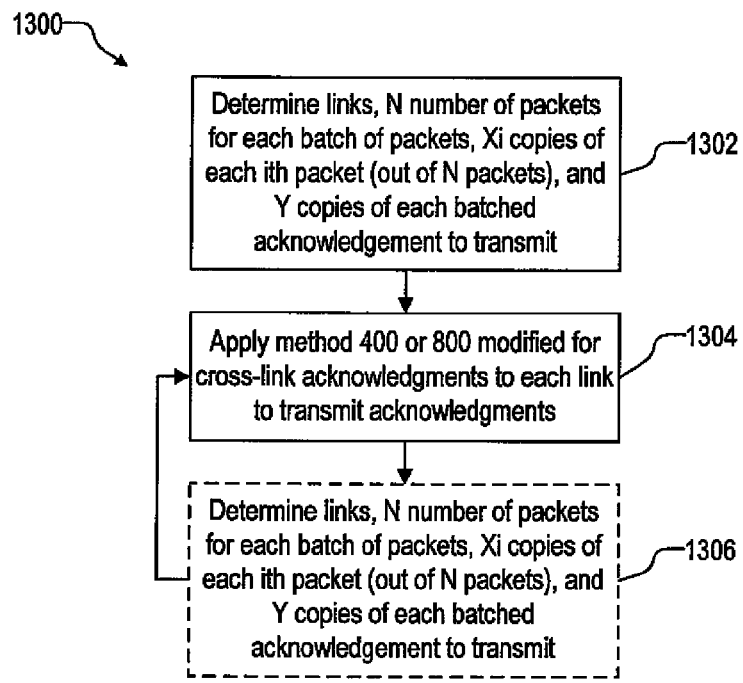
FIG. 13 is a flowchart of an example method executed by a second wireless communication device for receiving packets from a first wireless communication device using the scheme of FIG. 10 or 11 in accordance with one or more embodiments of the present disclosure.

FIG. 13 is a flowchart of an example method 1100 executed by the second wireless communication device 920 for receiving packets from the first wireless communication device 910 using the scheme of FIG. 10 or 11 in accordance with one or more embodiments of the present disclosure. Method 1300 includes one or more operations, functions or actions illustrated by blocks 1302-1306. Second wireless communication device 920 may be a mobile wireless device or a base station, or some other wireless communication device.

At block 1302, the second wireless communication device 920 may be arranged to determine which of wireless communication links 924 to use to communicate with the first wireless communication device 910, the number N of packets per batch to be transmitted by the first wireless communication device 910, the number $X_i$ of copies of each ith packet (out of N packets) to be transmitted by the first wireless communication device 910, and the number Y of copies of the acknowledgement to be transmitted by the second wireless communication device 920. Depending on the embodiment, the second wireless communication device 920 may be arranged to optimize these parameters using intensive calculations on trace data, Monte Carlo-based simulations on trace data, or by making calculations on-line (i.e., in real time) with current trace data. The second wireless communication device 920 may be adapted to send these parameters to the first wireless communication device 910 during a handshake for setting up the communication between the two devices. Alternatively, the first wireless communication device 910 may be arranged to determine these parameters and may transmit them to the second wireless communication device 920 during the handshake. Block 1302 may be followed by block 1304.

At block 1304, the second wireless communication device 920 may be configured to apply method 400 modified for cross-link acknowledgments for the scheme shown in FIG. 10. In the modified method 400, block 402 and optional block 424 may be replaced by blocks 1302 described above and optional block 1306 described below, respectively. The remainder of the blocks in method 400 may be applied to each wireless communication link, and blocks 410 and 422 may be modified so the second wireless communication device 920 may generate a cross-link acknowledgement that indicates or implies the packets that should be retransmitted.

Alternatively, the second wireless communication device 920 may be arranged to apply method 800 modified for cross-link batched acknowledgments for the scheme shown in FIG. 11. In the modified method 800, block 802 and optional block 824 may be replaced by blocks 1302 described above and optional block 1306 described below, respectively. The remainder of the blocks in method 800 may be applied to each wireless communication link, and blocks 810 and 822 may be modified so the second wireless communication device 920 may generate a cross-link batched acknowledgement that indicates or implies the packets that should be retransmitted. Block 1304 may be followed by optional block 1306.

At optional block 1306, the second wireless communication device 920 may be arranged to determine the link selection, N, $X_i$, and Y on-line (i.e., in real time) using one or more of the current link conditions based on trace data, such as the current reception rates of the wireless communication links, and send the parameters to the first wireless communication device 910 in another handshake. The second wireless communication device 920 may also be arranged to decide to optimize the link selection, N, $X_1$ to $X_N$, and Y differently based on the current device conditions, such as the current status of the battery charge of the devices. For example, the second wireless communication device 920 may decide to optimize the link selection, N, $X_1$ to $X_N$, and Y for energy consumption over throughput and latency based on the battery charge of the devices. Optional block 1306 may loop back to block 1304 in which the second wireless communication device 920 may transmit acknowledgment.

The presently described multi-copy transmission scheme may be optimized for one or more of throughput, latency, and energy consumption by adjusting the number N of packets per batch, the number $X_i$ of copies of each ith packet (out of N packets), and the number Y of copies of each acknowledgement acknowledgments transmitted, and by selecting which of the available wireless communication links between the devices to use. In some examples, one metric (throughput, latency, or energy consumption) may be optimized while imposing the other metrics as constraints or a Pareto optimal solution can be determined where one metric is improved without worsening the other metrics. For example, a multi-copy transmission scheme optimized for latency may be balanced for throughput optimization and/or energy minimization. Similarly, a multi-copy transmission scheme optimized for energy consumption may be balanced for latency and throughput optimization.

The described multi-copy transmission schemes may be optimized for throughput relative to the context of the packet. For example, real time movies may require large throughput, so the ideal combination of N, $X_i$ and Y may be determined relative to the data type (e.g., real time movies) for the packet payload. In addition, content that is merely synchronized or stored (where latency is not an issue or not that important) may be satisfied with lower throughput which can result in lower energy consumption.

The multi-copy transmission scheme may be optimized for one or more of throughput, latency, and energy consumption. Techniques for optimization may utilize intensive calculations based on long trace data to determine an approximately optimal combination of N, $X_i$, Y, and link selection. The optimization may impose strong abstractions about the known and constant reception rates of each of the wireless communication links (forward and backward), their statistical independence, and may derive closed form formula for expected communication cost in terms of expected time and/or consumed energy. Optimization techniques include linear programming, convex programming, non-linear programming, simulated annealing, taboo search, genetic algorithms, simulated evolution, iterative improvement, neighborhood search, parallel tempering, and stochastic tunneling.

Instead of using actual trace data, a Monte Carlo-based simulation that considers the whole complexity of actually deployed systems in their complex environments may be used to determine the optimal combination of N, $X_i$, Y, and link selection. The Monte Carlo-based simulation may be augmented with data driven statistical analysis of the obtained results. Short trace data from actually deployed wireless communication devices or simulated short trace data from statistical models may be used to perform the Monte-Carlo simulation. Note that simulated trace data may not be able to capture some prosperities such as variable reception rates of each link, autocorrelation, mutual link correlation in MIMO systems, level of asymmetry, etc. This scheme can be used to approximately optimize any relevant quality of communication service metrics, including one or more of maximal allowed latency, throughput, and/or energy consumption at one or both communicating devices. Monte Carlo-based simulation may be followed by statistical analysis in order to minimize the required number of trace data. For example, the instances with similar input parameters can be smoothed. Its effectiveness can be further improved if biased trace data are produced to steer the simulation in a desired direction. Monte Carlo-based simulation techniques include importance sampling, stratified sampling, recursive stratified sampling, Las Vegas algorithm, Markov chain Monte Carlo (MCMC), random walk algorithms, avoiding random walk algorithms, reversible jump, etc. Statistical analysis techniques include linear regression, polynomial regression, logistic regression, neural networks, kernel density estimation, splines, wavelets, probit regression, ordered logic regression, isotonic regression, generalized linear models, etc.

Figure 14:
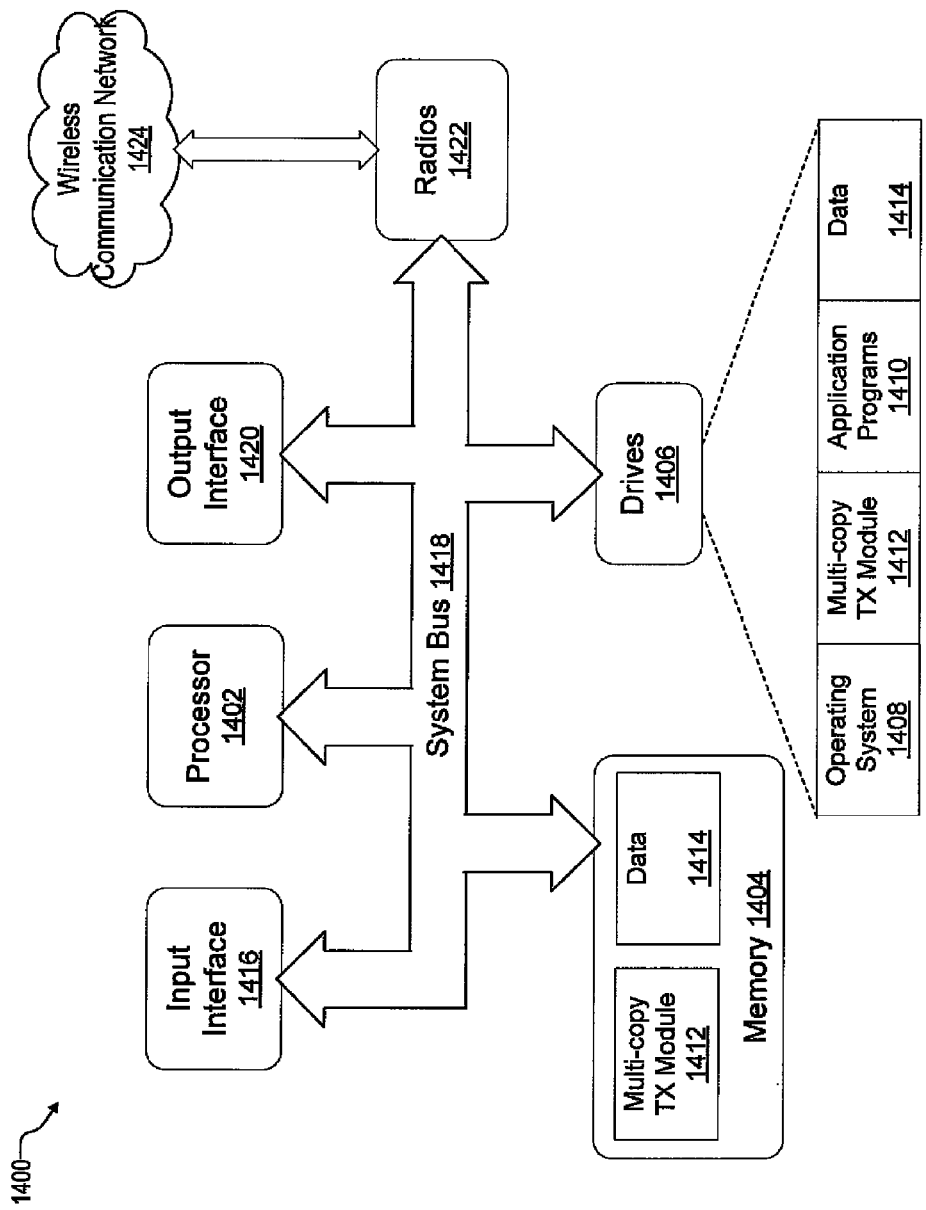
FIG. 14 illustrates an example wireless device for implementing embodiments of the multi-copy transmission scheme of the present disclosure.

FIG. 14 illustrates an example wireless device 1400 for implementing embodiments of the multi-copy transmission scheme of the present disclosure. Wireless device 1400 includes a processor 1402, memory 1404, and one or more drives 1406. Drives 1406 may be arranged to provide storage of one or more of an operating system 1408, application programs 1410, a multi-copy transmission module 1412, and data 1414. Processor 1402 may be arranged to load multi-copy transmission module 1412 into memory 1404, execute module 1412 to modify data 1414, and save data 1414 in drives 1406.

Wireless device 1400 may further include an input interface 1416 through which commands and data may be entered. Input devices may be coupled to the input interface 1416, and may comprise an electronic digitizer, a microphone, a keyboard or a pointing device, commonly referred to as a mouse, trackball or touch pad. Other example input devices may include a joystick, game pad, satellite dish, scanner, or the like.

These and other input devices can be coupled to processor 1402 through the input interface 1416 that may be coupled to a system bus 1418, but may be coupled by other interface and bus structures, such as a parallel port, game port or a universal serial bus (USB). Wireless device 1400 may also include other peripheral output devices such as speakers and video displays which may be coupled through an output interface 1420 or the like.

Wireless device 1400 may communicate with one or more remote devices in a wireless communication network 1424 through one or more radios 1422 (e.g., transmitters and receivers). A remote device may be another wireless device, a personal computer (PC), a server, a router, a network PC, a mobile phone, a peer device, or other common network node, and can include many or all of the elements described above relative to wireless device 1400.

According to one embodiment, wireless device 1400 may be coupled to a wireless networking environment such that the processor 1402 and/or program modules 1412 can perform the multi-copy transmission scheme with embodiments herein.

Figure 15:
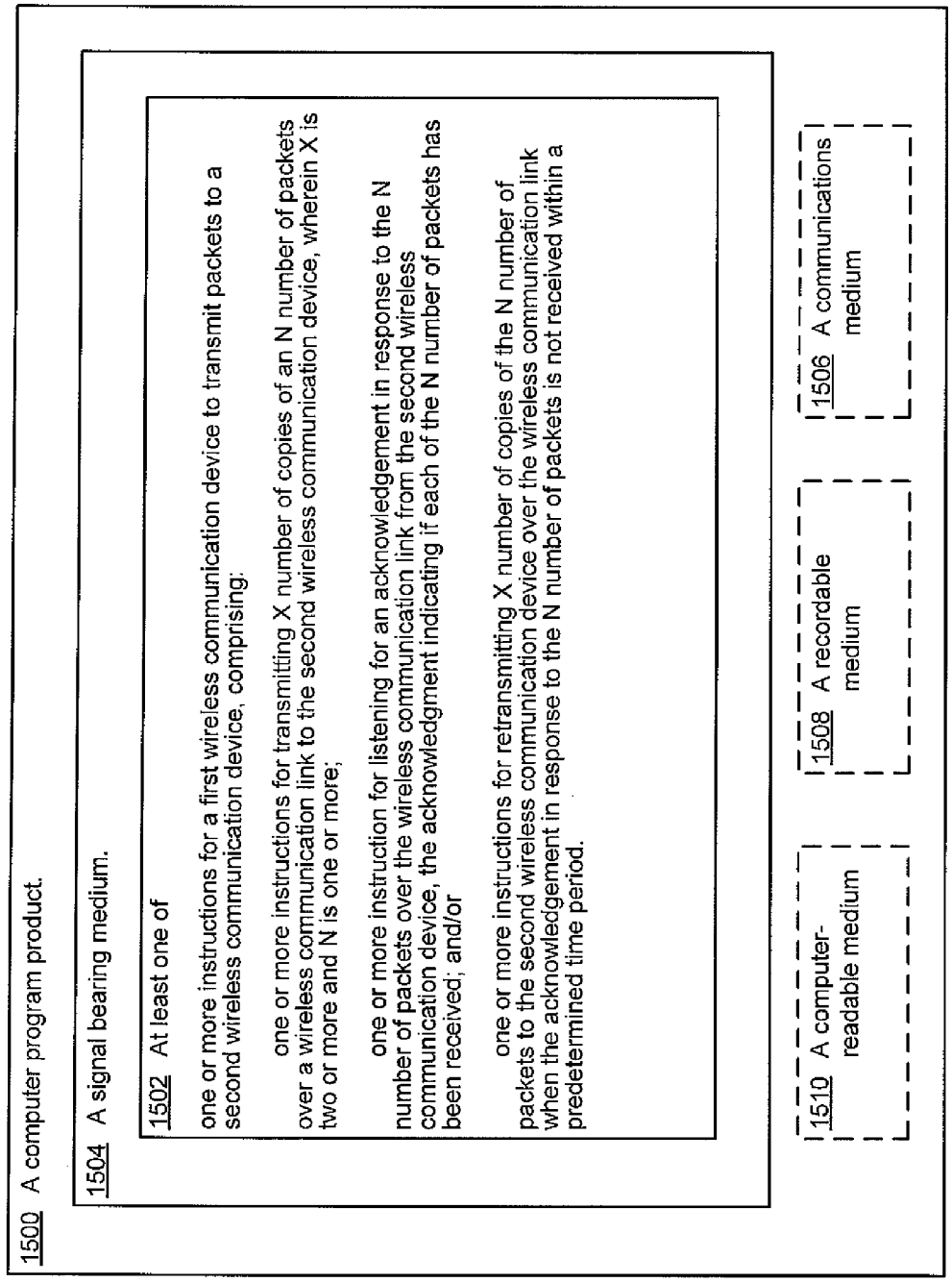
FIG. 15 is a block diagram illustrating a computer program product for a first wireless communication device arranged in accordance with one or more embodiments of the present disclosure.

FIG. 15 is a block diagram illustrating a computer program product 1500 for first wireless communication device 110 or 910 in embodiments of the present disclosure. Computer program product 1500 may include one or more sets of instructions 1502 for executing the methods of the presently disclosed multi-copy transmission schemes. Computer program product 1500 may be transmitted in a signal bearing medium 1504 or another similar communication medium 1506. Computer program product 1500 may be recorded in a computer readable medium 1508 or another similar recordable medium 1510.

Figure 16:
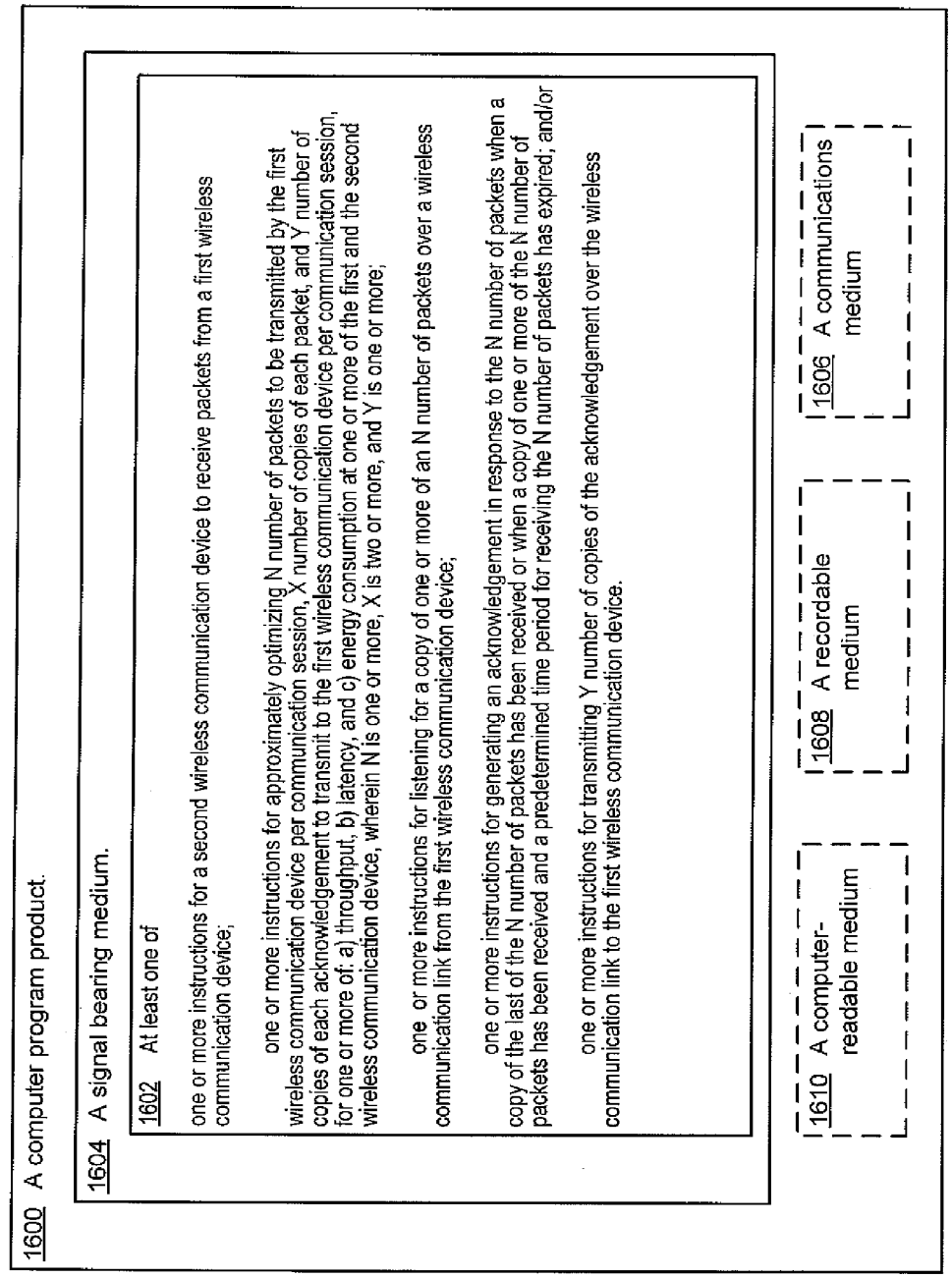
FIG. 16 is a block diagram illustrating a computer program product for a second wireless communication device arranged in accordance with one or more embodiments of the present disclosure.

FIG. 16 is a block diagram illustrating a computer program product 1600 for second wireless communication device 120 or 920 arranged in accordance with some embodiments of the present disclosure. Computer program product 1600 may include one or more sets of instructions 1602 for executing the presently disclosed methods of the multi-copy transmission scheme. Computer program product 1600 may be transmitted in a signal bearing medium 1604 or another similar communication medium 1606. Computer program product 1600 may be recorded in a computer readable medium 1608 or another similar recordable medium 1610.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A data processing system may be implemented utilizing any suitable commercially available components, such as those that may be found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

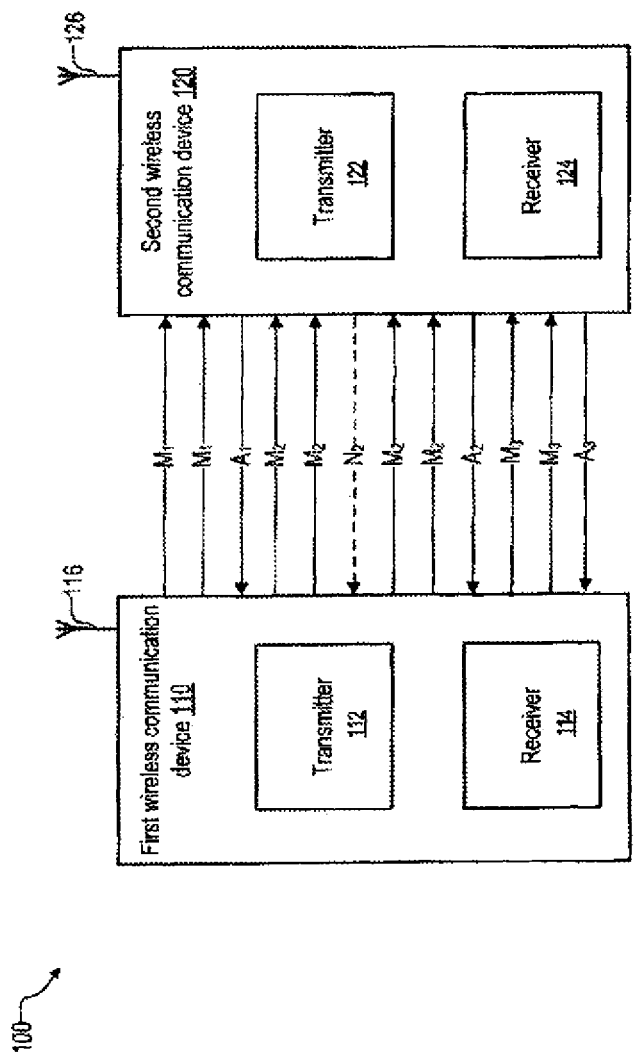

I claim:

1. A method for a first wireless communication device to communicate packets to a second wireless communication device, the method for the first wireless communication device comprising:
   performing a handshake over a first wireless communication link with the second wireless communication device to set parameters N and Xi;
   in an original transmission of first N packets, transmitting Xi copies of each ith packet in the first N packets over the first wireless communication link to the second wireless communication device, wherein N is one or more and at least one Xi is two or more;
   listening for a first acknowledgement in response to the first N packets over the first wireless communication link from the second wireless communication device, the first acknowledgment indicating if each of the first N packets has been received; and
   in a retransmission of the first N packets subsequent to the original transmission, retransmitting Xi copies of each ith packet in the first N packets to the second wireless communication device over the first wireless communication link when the first acknowledgement in response to the first N packets is not received within a predetermined time period.

2. The method of claim 1, further comprising:
   transmitting Xi copies of each ith packet in second N packets over the first wireless communication link to the second wireless communication device when the first acknowledgement in response to the first N packets is received within the predetermined time period and the first acknowledgment indicates or implies a copy of each of the first N packets has been received by the second wireless communication device.

3. The method of claim 1, wherein the first wireless communication device is a MIMO wireless communication device, the method further comprising:
   transmitting Xi copies of each ith packet in second N packets over a second wireless communication link to the second wireless communication device at the same time as transmitting Xi copies of each ith packet in the first N packets.

4. The method of claim 3, further comprising:
   listening for the first acknowledgement over the second wireless communication link from the second wireless communication device at the same time as listening for the first acknowledgement over the first wireless communication link, wherein the first acknowledgment further indicates or implies if each of the second N packets has been received by the second wireless communication device.

5. The method of claim 4, further comprising:
   retransmitting Xi copies of any ith packet that the first acknowledgment indicates or implies a reception failure over one of the first wireless communication link and the second wireless communication link.

6. The method of claim 3, wherein the first N packets and the second N packets comprise one or more of the same packets.

7. The method of claim 3, further comprising:
   transmitting Xi copies of each ith packet in third N packets over a third wireless communication link to the second wireless communication device, wherein the third N packets comprise one packet that is an XOR result of one of the first N packets and one of the second N packets.

8. The method of claim 7, further comprising approximately optimizing two or more of N, Xi, and Y for one or more of: throughput, latency, and energy consumption, wherein Y is the number of copies of each acknowledgement from the second wireless communication device, and wherein one or more of N, Xi, and Y is approximately optimized based on simulated trace data from a Monte-Carlo-based simulation.

9. The method of claim 3, further comprising selecting the first wireless communication link and the second wireless communication link from available wireless communication links between the first and the second wireless communication devices to optimize one or more of: throughput, latency, and energy consumption.

10. The method of claim 9, wherein the first wireless communication device is either a base station or a mobile wireless device.

11. The method of claim 1, further comprising approximately optimizing two or more of N, Xi, and Y for one or more of: throughput, latency, and energy consumption, wherein Y is the number of copies of each acknowledgement from the second wireless communication device.

12. The method of claim 11, wherein the first wireless communication device is either a base station or a mobile wireless device.

13. The method of claim 11, wherein one or more of N, Xi, and Y is approximately optimized based on historical trace data.

14. The method of claim 11, wherein one or more of N, Xi, and Y is approximately optimized based on simulated trace data from a Monte-Carlo-based simulation.

15. The method of claim 11, wherein one or more of N, Xi, and Y is approximately optimized based on one or more of current trace data after transmitting Xi copies of each ith packet in the first N packets and current power of one or more of the first and the second wireless communication devices.

16. The method of claim 1, wherein one or more of N, Xi, and Y is approximately optimized based on the content of the packet.

17. A method for a first wireless communication device to communicate packets to a second wireless communication device, the method for the first wireless communication device comprising:
   transmitting Xi copies of each ith packet in N packets over a wireless communication link to the second wireless communication device, wherein one or more of Xi and N is two or more;
   listening for an acknowledgement in response to the N packets over the wireless communication link from the second wireless communication device, the acknowledgment indicating if each of the N packets has been received;

switching the first wireless communication device from an active mode to a temporary sleep mode after receiving a copy of the acknowledgement in response to the N packets to avoid receiving another copy of the acknowledgement; and retransmitting Xi copies of each ith packet in the N packets to the second wireless communication device over the wireless communication link when the acknowledgement in response to the N packets is not received within a predetermined time period.

18. The method of claim 17, wherein a duration of the temporary sleep mode depends on a copy number of the received copy of the acknowledgement out of a total number of copies of the acknowledgment.

19. A method for a second wireless communication device to receive packets from a first wireless communication device, the method for the second wireless communication device comprising:

approximately optimizing N packets to be transmitted by the first wireless communication device for a communication session, Xi copies of each ith packet in the N packets for an original transmission and any retransmission subsequent to the original transmission, and Y copies of each acknowledgement to transmit to the first wireless communication device per communication session, for one or more of: a) throughput, b) latency, and c) energy consumption at one or more of the first and the second wireless communication device, wherein N is one or more, at least one Xi is two or more, and Y is one or more;

performing a handshake over a first wireless communication link with the first wireless communication device to set parameters N, Xi, and Y;

listening for a copy of one or more of first N packets over a first wireless communication link from the first wireless communication device;

generating a first acknowledgement in response to the first N packets when a copy of the last of the first N packets has been received or when a copy of one or more of the first N packets has been received and a predetermined time period for receiving the N packets has expired; and transmitting Y copies of the first acknowledgement over the first wireless communication link to the first wireless communication device.

20. The method of claim 19, further comprising:

listening for a copy of one or more of second N packets over the first wireless communication link from the first wireless communication device;

retransmitting Y copies of the first acknowledgement in response to the first N packets over the first wireless communication link to the first wireless communication device when a predetermined time period for receiving the second N packets expires before receiving any of the second N packets;

generating a second acknowledgement in response to the second N packets when a copy of the last of the second N packets has been received or when a copy of one or more of the second N packets has been received and the predetermined time period for receiving the second N packets has expired; and transmitting Y copies of the second acknowledgement over the first wireless communication link to the first wireless communication device.

21. The method of claim 20, wherein the first acknowledgment indicates or implies whether each of the first N packets has been received, and the second acknowledgement indicates or implies whether each of the second N packets has been received.

22. The method of claim 19, wherein the second wireless communication device is a MIMO wireless communication device, the method further comprising:

listening for a copy of one or more of second N packets over a second wireless communication link from the first wireless communication device at the same time as listening for the first N packets over the first wireless communication link.

23. The method of claim 22, further comprising:

transmitting the first acknowledgment over the second wireless communication link to the first wireless communication device at the same time as transmitting the first acknowledgment over the first wireless communication, wherein the first acknowledgment further indicates or implies whether each of the second N packets has been received by the second wireless communication device.

24. The method of claim 22, wherein the first N packets and the second N packets comprise one or more of the same packets.

25. The method of claim 22, further comprising:

listening for a copy of one or more of third N number of packets over a third wireless communication link from the first wireless communication device, wherein the third N packets comprise one packet that is an XOR result of one of the first N packets and one of the second N packets.

26. The method of claim 19, wherein the second wireless communication device is either a base station or a mobile wireless device.

27. The method of claim 19, wherein one or more of N, Xi, and Y is approximately optimized based on historical trace data.

28. The method of claim 19, wherein one or more of N, Xi, and Y is approximately optimized based on simulated trace data from a Monte-Carlo-based simulation.

29. The method of claim 19, wherein one or more of N, Xi, and Y is approximately optimized based on one or more of current trace data after transmitting Xi copies of each ith packet in the first N packets and current power of one or more of the first and the second wireless devices.

30. The method of claim 19, wherein one or more of N, Xi, and Y is approximately optimized based on the content of the packet.

31. A method for a second wireless communication device to receive packets from a first wireless communication device, the method for the second wireless communication device comprising:

approximately optimizing N packets to be transmitted by the first wireless communication device for a communication session, Xi copies of each ith packet in the N packets, and Y copies of each acknowledgement to transmit to the first wireless communication device for the communication session, for one or more of: a) throughput, b) latency, and c) energy consumption at one or more of the first and the second wireless communication device, wherein one or more of Xi and N is two or more, and Y is one or more;

listening for a copy of one or more of the N packets over a wireless communication link from the first wireless communication device;

switching to a temporary sleep mode after receiving a copy of a packet in the N packets from the first wireless communication device to avoid receiving another copy of the packet;

generating the acknowledgement in response to the N packets when a copy of the last of the N packets has been received or when a copy of one or more of the N packets has been received and a predetermined time period for receiving the N packets has expired; and transmitting Y copies of the acknowledgement over the wireless communication link to the first wireless communication device.

32. A first wireless communication device arranged to communicate packets to a second wireless communication device, the first wireless communication device comprising:

a memory storing instructions; and a processor configured to execute the instructions in the memory to:

transmit Xi copies of each ith packet in N packets over a wireless communication link to the second wireless communication device, wherein N is one or more and at least one Xi is two or more;

listen for an acknowledgement in response to the N packets over the wireless communication link from the second wireless communication device, the acknowledgment indicating if each of the N packets has been received;

switch the first wireless communication device from an active mode to a temporary sleep mode after receiving a copy of the acknowledgement in response to the N packets to avoid receiving another copy of the acknowledgement; and retransmit Xi copies of each ith packet in the N packets to the second wireless communication device over the wireless communication link when the acknowledgement in response to the N packets is not received within a predetermined time period.

33. The first wireless communication device of claim 32, wherein the processor is configured to execute the instructions in the memory to approximately optimize two or more of N, Xi, and Y for one or more of: throughput, latency, and energy consumption, wherein Y is the number of copies of each acknowledgement from the second wireless communication device.

34. A second wireless communication device to receive packets from a first wireless communication device, the second wireless communication device comprising:

a memory storing instructions; and a processor configured to execute the instructions in the memory to:

approximately optimize N packets to be transmitted by the first wireless communication device for a communication session, Xi copies of each ith packet in the N packets for an original transmission and any retransmission subsequent to the original transmission, and Y copies of each acknowledgement to transmit to the first wireless communication device for the communication session, for one or more of: a) throughput, b) latency, and c) energy consumption at one or more of the first and the second wireless communication device, wherein N is one or more, at least one Xi is two or more, and Y is one or more;

performing a handshake over a first wireless communication link with the first wireless communication device to set parameters N, Xi, and Y;

listen for a copy of one or more of the N packets over a wireless communication link from the first wireless communication device;

generate an acknowledgement in response to the N packets when a copy of the last of the N packets has been received or when a copy of one or more of the N packets has been received and a predetermined time period for receiving the N packets has expired; and transmit Y copies of the acknowledgement over the wireless communication link to the first wireless communication device.

35. The second wireless communication device of claim 34, wherein the processor is configured to execute the instructions in the memory to switch to a temporary sleep mode after receiving a copy of a packet in the N packets from the first wireless communication device to avoid receiving another copy of the packet.

36. A non-transitory computer-readable storage medium encoded with computer-executable instructions for execution by a first wireless device to communicate packets to a second wireless communication device, the instructions comprising:

transmitting Xi copies of each ith packet in N packets over a wireless communication link to the second wireless communication device, wherein N is one or more and at least one Xi is two or more;

listening for an acknowledgement in response to the N packets over the wireless communication link from the second wireless communication device, the acknowledgment indicating if each of the N packets has been received;

switching the first wireless communication device from an active mode to a temporary sleep mode after receiving a copy of the acknowledgement in response to the N packets to avoid receiving another copy of the acknowledgement; and retransmitting Xi copies of each ith packet in the N packets to the second wireless communication device over the wireless communication link when the acknowledgement in response to the N packets is not received within a predetermined time period.

37. The non-transitory computer-readable storage medium of claim 36, wherein the instructions further comprise approximately optimizing two or more of N, Xi, and Y for one or more of: throughput, latency, and energy consumption, wherein Y is the number of copies of each acknowledgement from the second wireless communication device.

38. A non-transitory computer-readable storage medium encoded with computer-executable instructions for execution by a second wireless device to receive packets from a first wireless communication device, the instructions comprising:

approximately optimizing N packets to be transmitted by the first wireless communication device for a communication session, Xi copies of each ith packet in the N packets for an original transmission and any retransmission subsequent to the original transmission, and Y number of copies of each acknowledgement to transmit to the first wireless communication device for the communication session, for one or more of: a) throughput, b) latency, and c) energy consumption at one or more of the first and the second wireless communication device, wherein N is one or more, at least one Xi is two or more, and Y is one or more;

performing a handshake over a first wireless communication link with the first wireless communication device to set parameters N, Xi, and Y;

listening for a copy of one or more of the N packets over a wireless communication link from the first wireless communication device;

generating an acknowledgement in response to the N packets when a copy of the last of the N packets has been received or when a copy of one or more of the N packets has been received and a predetermined time period for receiving the N packets has expired; and transmitting Y copies of the acknowledgement over the wireless communication link to the first wireless communication device.

39. The non-transitory computer-readable storage medium of claim 38, wherein the instructions further comprise switching to a temporary sleep mode after receiving a copy of a packet in the N packets from the first wireless communication device to avoid receiving another copy of the packet.

* * * * *

UNITED STATES PATENT AND TRADEMARK OFFICE
CERTIFICATE OF CORRECTION

PATENT NO.        : 8,539,296 B2
APPLICATION NO.   : 12/463460
DATED             : September 17, 2013
INVENTOR(S)       : Potkonjak Page 1 of 3

It is certified that error appears in the above-identified patent and that said Letters Patent is hereby corrected as shown below:

In the Drawings:

In Fig. 2, Sheet 1 of 13, delete " 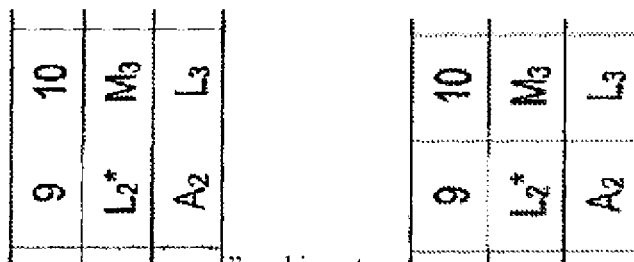 " and insert -- -- , therefor.
(See attached Drawing Sheet)

In the Specification:

In Column 1, Line 42, delete "FIG. I" and insert -- FIG. 1 --, therefor.

In Column 2, Line 62, delete "devices" and insert -- devices. --, therefor.

In Column 3, Line 56, delete "deices" and insert -- devices --, therefor.

In Column 4, Line 6, delete "he" and insert -- the --, therefor.

In Column 4, Line 62, delete "communication devices 110 and 112" and insert -- communication devices 110 and 120 --, therefor.

In Column 10, Line 49, delete "communication devices 110 and 112" and insert -- communication devices 110 and 120 --, therefor.

In Column 15, Line 51, delete "the a" and insert -- the --, therefor.

Signed and Sealed this
Twentieth Day of May, 2014

Michelle K. Lee
*Deputy Director of the United States Patent and Trademark Office*

In Column 17, Line 14, delete "communication devices 910 and 912" and insert -- communication devices 910 and 920 --, therefor.

In Column 17, Line 51, delete "communication devices 910 and 912" and insert -- communication devices 910 and 920 --, therefor.